(12) United States Patent
Thrash et al.

(10) Patent No.: US 10,562,588 B2
(45) Date of Patent: Feb. 18, 2020

(54) BICYCLE CASSETTE WITH LOCKING CONNECTION

(71) Applicant: THE HIVE GLOBAL, INC., Taichung (TW)

(72) Inventors: Greg Thrash, Petaluma, CA (US); Joel Peters, Taichung (TW)

(73) Assignee: The Hive Global, Inc, Taichung (TW)

( * ) Notice: Subject to any disclaimer, the term of this patent is extended or adjusted under 35 U.S.C. 154(b) by 158 days.

(21) Appl. No.: 15/165,327

(22) Filed: May 26, 2016

(65) Prior Publication Data
US 2017/0057598 A1    Mar. 2, 2017

Related U.S. Application Data

(60) Provisional application No. 62/213,034, filed on Sep. 1, 2015.

(51) Int. Cl.
*B62M 9/10*    (2006.01)

(52) U.S. Cl.
CPC .................................... *B62M 9/10* (2013.01)

(58) Field of Classification Search
CPC ........ B62M 9/10; B62M 9/125; B62M 9/128; F16H 55/30
USPC ......................................................... 474/160
See application file for complete search history.

(56) References Cited

U.S. PATENT DOCUMENTS

| 512,729 A | 1/1894 | Lucas |
|---|---|---|
| 527,384 A | 10/1894 | Davids |
| 527,520 A | 10/1894 | Copeland |
| 547,639 A | 10/1895 | Grubb |
| 575,712 A | 1/1897 | Hamilton |
| 576,548 A | 2/1897 | Cassidy |
| 579,479 A | 3/1897 | Gobbler |
| 590,685 A | 9/1897 | Matthews |
| 595,388 A | 12/1897 | Hanson |
| 598,325 A | 2/1898 | McIntyre |
| 614,900 A | 11/1898 | Seaver |
| 616,167 A | 12/1898 | Walker |
| 620,266 A | 2/1899 | Woodiska |
| 666,679 A | 1/1901 | Kraus |

(Continued)

FOREIGN PATENT DOCUMENTS

| DE | 19751879 A1 | 5/1999 |
|---|---|---|
| DE | 102007028897 A1 | 1/2009 |

(Continued)

OTHER PUBLICATIONS

Mountain Cycle Catalog 2000, www.MountainCycle.com.

(Continued)

*Primary Examiner* — Michael R Mansen
*Assistant Examiner* — Robert T Reese
(74) *Attorney, Agent, or Firm* — Haverstock & Owens LLP

(57) ABSTRACT

A bicycle cassette comprises two segments that are attached together thereby forming a composite cassette that can be attached to a rear bicycle hub driver body. The bicycle cassette allows for the use of a smaller sprocket on one segment of the cassette because the smaller sprockets can overhang the hub driver body. Specifically, the cassette allows a small 9 or 10 tooth sprocket to overhang the cassette driver body on the bicycle hub by attaching a small sprocket assembly to a larger sprocket assembly using a locking, bayonet style attachment.

24 Claims, 15 Drawing Sheets

(56) References Cited

U.S. PATENT DOCUMENTS

| | | |
|---|---|---|
| 1,070,971 A | 8/1913 | Lowd |
| 1,325,206 A | 12/1919 | Raybon |
| 1,400,131 A | 12/1921 | Adams |
| 1,535,601 A | 4/1925 | Graham |
| 1,636,327 A | 7/1927 | Roe |
| 2,024,499 A | 12/1935 | Baron |
| 2,228,770 A | 1/1941 | Le Toumeau |
| 2,317,070 A | 4/1943 | Le Toumeau |
| 2,567,785 A | 9/1951 | Rieger |
| 2,568,443 A | 9/1951 | Gerner |
| 2,751,797 A | 6/1956 | Pearl |
| 3,184,993 A | 5/1965 | Swenson |
| 3,185,439 A | 5/1965 | Tarutani |
| 3,303,720 A | 2/1967 | Jaulmes |
| D208,683 S | 9/1967 | Schreckengost |
| 3,382,734 A | 5/1968 | Hussey |
| 3,416,385 A | 12/1968 | Schenk |
| 3,477,303 A | 11/1969 | Brilando |
| 3,485,113 A | 12/1969 | Adcock |
| 3,592,076 A | 7/1971 | Baginski |
| 3,760,653 A | 9/1973 | Hagenah |
| 3,785,129 A | 1/1974 | Anthamatten |
| 3,807,255 A | 4/1974 | Baginski |
| 3,811,339 A | 5/1974 | Konzorr |
| 3,869,138 A | 3/1975 | Allison |
| 3,910,136 A | 10/1975 | Juy |
| 3,964,343 A | 6/1976 | Lauterbach |
| 3,973,447 A | 8/1976 | Nagano |
| 4,016,357 A | 4/1977 | Abrahamsen |
| 4,044,621 A | 8/1977 | McGregor, Sr. |
| 4,078,444 A | 3/1978 | Huret |
| 4,089,236 A | 5/1978 | Genzling |
| 4,093,325 A | 6/1978 | Troccaz |
| 4,135,727 A | 1/1979 | Camagnolo |
| 4,237,743 A | 12/1980 | Nagano |
| 4,240,303 A | 12/1980 | Mosley |
| 4,269,084 A | 5/1981 | Okajima |
| 4,298,210 A | 11/1981 | Lotteau |
| 4,302,987 A | 12/1981 | Takeda |
| 4,330,137 A | 5/1982 | Nagano |
| 4,337,933 A | 7/1982 | Egami |
| 4,377,952 A | 3/1983 | Gamondes |
| 4,398,434 A | 8/1983 | Kimura |
| 4,433,963 A | 2/1984 | Shimano |
| 4,439,172 A | 3/1984 | Segawa |
| 4,441,383 A | 4/1984 | Segawa |
| 4,442,732 A | 4/1984 | Okajima |
| 4,445,289 A | 5/1984 | Beneteau |
| 4,445,397 A | 5/1984 | Shimano |
| 4,472,163 A | 9/1984 | Bottini |
| 4,475,894 A | 10/1984 | Sugino |
| 4,487,424 A | 12/1984 | Ellis |
| 4,488,453 A | 12/1984 | Drugeon |
| 4,498,890 A | 2/1985 | Sutherland |
| 4,506,463 A | 3/1985 | Chassing |
| 4,507,105 A | 3/1985 | Stottmann |
| 4,515,386 A | 5/1985 | Tsujimura |
| 4,523,492 A | 6/1985 | Shimano |
| 4,538,480 A | 9/1985 | Trindle |
| 4,573,950 A | 3/1986 | Nagano |
| 4,608,878 A | 9/1986 | Shimano |
| 4,632,416 A | 12/1986 | Zelenetz |
| 4,639,240 A | 1/1987 | Liu |
| 4,640,151 A | 2/1987 | Howell |
| 4,646,586 A | 3/1987 | Raposarda |
| 4,662,862 A | 5/1987 | Matson |
| 4,665,767 A | 5/1987 | Lassche |
| 4,686,867 A | 8/1987 | Bernard |
| 4,704,919 A | 11/1987 | Durham |
| 4,735,107 A | 4/1988 | Winkie |
| D298,613 S | 11/1988 | McMurtey |
| 4,791,692 A | 12/1988 | Collins |
| 4,803,894 A | 2/1989 | Howell |
| 4,815,333 A | 3/1989 | Sampson |
| 4,827,633 A | 5/1989 | Feldstein |
| 4,832,667 A | 5/1989 | Wren |
| 4,838,115 A | 6/1989 | Nagano |
| 4,840,085 A | 6/1989 | Nagano |
| 4,854,924 A | 8/1989 | Nagano |
| 4,873,890 A | 10/1989 | Nagano |
| 4,882,946 A | 11/1989 | Beyl |
| 4,893,523 A | 1/1990 | Lennon |
| 4,898,063 A | 2/1990 | Sampson |
| 4,905,541 A | 3/1990 | Alan |
| 4,923,324 A | 5/1990 | Favrou |
| 4,928,549 A | 5/1990 | Nagano |
| 4,932,287 A | 6/1990 | Ramos |
| 4,947,708 A | 8/1990 | Lacomb |
| 5,002,520 A | 3/1991 | Greenlaw |
| 5,003,841 A | 4/1991 | Nagano |
| 5,014,571 A | 5/1991 | Dapezi |
| 5,018,564 A | 5/1991 | Anglin |
| 5,046,382 A | 9/1991 | Steinberg |
| 5,048,369 A | 9/1991 | Chen |
| 5,060,537 A | 10/1991 | Nagano |
| 5,067,930 A | 11/1991 | Morales |
| D323,309 S | 1/1992 | Perry |
| 5,115,692 A | 5/1992 | Nagano |
| 5,121,935 A | 6/1992 | Mathieu et al. |
| 5,195,397 A | 3/1993 | Nagano |
| 5,203,229 A | 4/1993 | Chen |
| 5,207,768 A | 5/1993 | Gluys |
| 5,209,581 A | 5/1993 | Nagano |
| 5,259,270 A | 11/1993 | Lin |
| 5,320,582 A | 6/1994 | Takeda |
| 5,326,331 A | 7/1994 | Hallock, III |
| 5,379,665 A | 1/1995 | Nagano |
| D355,872 S | 2/1995 | Haney |
| 5,419,218 A | 5/1995 | Romano |
| 5,423,233 A | 6/1995 | Peyre |
| 5,460,576 A | 10/1995 | Barnett |
| 5,496,222 A | 3/1996 | Kojima |
| 5,497,680 A | 3/1996 | Nagano |
| 5,505,111 A | 4/1996 | Nagano |
| 5,522,282 A | 6/1996 | Nagano |
| 5,540,118 A | 7/1996 | Calendrille, Jr. |
| 5,549,396 A | 8/1996 | Chiang |
| 5,620,384 A | 4/1997 | Kojima |
| 5,626,060 A | 5/1997 | Lin |
| 5,676,616 A | 10/1997 | Hara |
| 5,679,084 A | 10/1997 | Daniels, III |
| 5,687,619 A | 11/1997 | Bryne |
| 5,725,450 A | 3/1998 | Huskey |
| 5,727,429 A | 3/1998 | Ueda |
| 5,728,018 A | 3/1998 | Terada |
| 5,765,450 A | 6/1998 | Kruger |
| 5,771,757 A | 6/1998 | Hanamura |
| 5,782,714 A | 7/1998 | Osgood |
| 5,806,379 A | 9/1998 | Nagano |
| 5,809,844 A | 9/1998 | Durham |
| 5,846,148 A | 12/1998 | Fuji |
| 5,927,155 A | 7/1999 | Jackson |
| 5,943,795 A | 8/1999 | Ueda |
| 6,003,889 A | 12/1999 | Shalom |
| 6,014,914 A | 1/2000 | Ueda |
| 6,039,665 A | 3/2000 | Nakamura |
| 6,059,378 A | 5/2000 | Dougherty |
| 6,060,982 A | 5/2000 | Holtrop |
| 6,083,132 A | 7/2000 | Walker |
| 6,117,032 A | 9/2000 | Nankou |
| 6,165,092 A | 12/2000 | Bramham |
| 6,203,459 B1 | 3/2001 | Calendrille, Jr. |
| 6,264,575 B1 * | 7/2001 | Lim .................. B62M 9/10 192/64 |
| 6,332,853 B1 | 12/2001 | Bowman |
| 6,354,973 B1 | 3/2002 | Barnett |
| 6,416,434 B1 | 7/2002 | Calendrille, Jr. |
| 6,490,948 B2 | 12/2002 | Tanaka |
| 6,520,048 B2 | 2/2003 | Chen |
| 6,533,690 B2 | 3/2003 | Barnett |
| 6,612,201 B1 | 9/2003 | Chen |
| 6,647,826 B2 | 11/2003 | Okajima |
| 6,725,742 B2 | 4/2004 | Bremer |
| 6,729,204 B1 | 5/2004 | Chen |

(56) References Cited

U.S. PATENT DOCUMENTS

| | | | |
|---|---|---|---|
| 6,988,427 B2 | 1/2006 | Yamanaka | |
| 7,013,754 B2 | 3/2006 | Milanowski | |
| 7,024,961 B2 | 4/2006 | Hsiao | |
| D522,414 S | 6/2006 | Chen | |
| 7,059,983 B2 | 6/2006 | Heim | |
| 7,066,856 B1 | 6/2006 | Rogers | |
| 7,066,857 B1 | 6/2006 | DeRosa | |
| D524,195 S | 7/2006 | Neal | |
| 7,108,428 B2 | 9/2006 | Ason | |
| 7,174,807 B2 | 2/2007 | Bryne | |
| 7,240,587 B2 | 7/2007 | Plassiard | |
| 7,334,500 B2 | 2/2008 | Tseng | |
| 7,523,685 B2 | 4/2009 | French | |
| 7,562,604 B2 | 7/2009 | Fukui | |
| 7,650,817 B2 | 1/2010 | Shiraishi et al. | |
| 7,886,947 B2 | 2/2011 | Campagnolo | |
| 8,025,304 B2 | 9/2011 | Smith | |
| 8,235,849 B2 | 8/2012 | Carnston et al. | |
| 8,491,429 B2 | 7/2013 | Cranston et al. | |
| 8,561,500 B2 | 10/2013 | D'Aluisio | |
| 8,641,151 B2 | 2/2014 | Kamada | |
| 2,015,430 A1 | 1/2015 | Matthews | |
| 9,458,871 B2 | 10/2016 | Ishizaki | |
| 2002/0028719 A1* | 3/2002 | Yamanaka | B62J 13/00 474/160 |
| 2002/0160869 A1 | 10/2002 | Barnett | |
| 2002/0170382 A1 | 11/2002 | Yang | |
| 2002/0194951 A1 | 12/2002 | Lowe | |
| 2003/0029271 A1 | 2/2003 | Shuman | |
| 2003/0051576 A1 | 3/2003 | Muraoka | |
| 2003/0064844 A1 | 4/2003 | Lin | |
| 2003/0183036 A1 | 10/2003 | Chou | |
| 2004/0009835 A1 | 1/2004 | Heim | |
| 2004/0037628 A1 | 2/2004 | Meggiolan | |
| 2004/0187635 A1 | 9/2004 | Bryne | |
| 2004/0200314 A1 | 10/2004 | Hermansen et al. | |
| 2004/0254038 A1 | 12/2004 | Chamberlain | |
| 2005/0005729 A1 | 1/2005 | Chen | |
| 2005/0081679 A1 | 4/2005 | Chen | |
| 2005/0252337 A1 | 11/2005 | Chen | |
| 2005/0284253 A1 | 12/2005 | Hervig | |
| 2006/0029317 A1 | 2/2006 | Yamamoto | |
| 2006/0081088 A1 | 4/2006 | Muraoka | |
| 2006/0199690 A1 | 9/2006 | Gardner | |
| 2006/0236809 A1 | 10/2006 | Bryne | |
| 2006/0258499 A1* | 11/2006 | Kamada | B62M 9/10 474/160 |
| 2006/0266154 A1 | 11/2006 | Hermansen | |
| 2006/0288819 A1 | 12/2006 | Dal Pra' et al. | |
| 2007/0034043 A1* | 2/2007 | Feltrin | B62B 3/00 74/594.1 |
| 2007/0049436 A1* | 3/2007 | Kamada | B62M 9/10 474/152 |
| 2007/0137432 A1 | 6/2007 | Chen | |
| 2007/0182122 A1 | 8/2007 | Smith | |
| 2007/0204720 A1 | 9/2007 | Poyzer | |
| 2008/0004143 A1* | 1/2008 | Kanehisa | B62M 9/10 474/160 |
| 2008/0152460 A1 | 6/2008 | Watanabe | |
| 2008/0289927 A1 | 11/2008 | Ji | |
| 2009/0042682 A1* | 2/2009 | Dal Pra' | B62M 9/10 474/160 |
| 2009/0078081 A1 | 3/2009 | French | |
| 2010/0275724 A1 | 11/2010 | Staples et al. | |
| 2010/0295265 A1 | 11/2010 | Burdick | |
| 2011/0105263 A1* | 5/2011 | Braedt | F16H 55/303 474/160 |
| 2011/0130233 A1* | 6/2011 | Tokuyama | B62M 9/10 474/116 |
| 2011/0140390 A1 | 6/2011 | Kuroiwa et al. | |
| 2012/0119565 A1 | 5/2012 | Kamada | |
| 2012/0225745 A1* | 9/2012 | Oishi | B62M 9/10 474/160 |
| 2012/0260767 A1 | 10/2012 | D'Aluisio | |
| 2013/0053195 A1 | 2/2013 | Emura et al. | |
| 2013/0053196 A1 | 2/2013 | Emura et al. | |
| 2013/0114999 A1 | 5/2013 | Ostling | |
| 2013/0225343 A1 | 8/2013 | Spahr et al. | |
| 2015/0024884 A1 | 1/2015 | Braedt | |
| 2015/0210353 A1 | 7/2015 | Tokuyama et al. | |
| 2016/0236749 A1 | 8/2016 | Cody | |
| 2017/0057598 A1 | 3/2017 | Thrash et al. | |
| 2017/0101124 A1 | 4/2017 | Assmann | |
| 2017/0314665 A1* | 11/2017 | Garcia | F16H 55/30 |

FOREIGN PATENT DOCUMENTS

| | | |
|---|---|---|
| DE | 10201621865 A1 | 12/2017 |
| EP | 0849155 A2 | 6/1998 |
| EP | 1792821 A1 | 6/2007 |
| EP | 2441656 A1 | 4/2012 |
| EP | 3 109 062 A1 | 12/2015 |

OTHER PUBLICATIONS

Mountain Bike Action Magazine, Oct. 2000, pp. 38-40, www.mbaction.com.
Mountain Cycle Shockwave—Photos.
Mountain Bike Action Magazine 2000, p. 138, www.mbaction.com.
Mountain Cycle Universal Chainguide Instructions, www.mountaincycle.com.
2001 Gizmo Installation Instructions, web.archive.org/web/20011025172447/http://mrdirt.com/gizmo/page4.htm.
Mr.Dirt Gizmo Pictures.
2006 Race Face Interbike(Trade Show)Booth, www.bikemagic.com.
Raceface Diabolous Chainguide Instructions.
Decline Magazine, Issue 20, Article "Its the New Style", Jan. Feb. 2006.
Diabolus Chainguide actual Product Photos.
International Search Report from PCT/US2017/023016.
International Preliminary Report on Patentability from PCT Application No. PCT/US2017/023016.
Machine translation of DE 19751879 obtained on Dec. 6, 2018.
International Search Report and Written Opinion from International Application No. PCT/US18/46952 dated Nov. 9, 2018.
The European Search Report dated Apr. 1, 2019 for European Application No. 16842566.8.
The European Search Report for European Application No. 17 77 0865 dated Jun. 13, 2019.

* cited by examiner

BICYCLE CASSETTE WITH LOCKING CONNECTION

RELATED APPLICATIONS

This Patent Application claims priority under 35 U.S.C. 119(e) of the U.S. provisional patent application, Application No. 62/213,034, filed on Sep. 1, 2015, and entitled "BICYCLE CASSETTE WITH LOCKING CONNECTION," which is also hereby incorporated by reference in its entirety.

FIELD OF THE INVENTION

The present invention is generally directed to bicycle sprockets and cassette assemblies. More specifically, the present invention is directed to a multi-piece bicycle cassette with a locking connection.

BACKGROUND OF THE INVENTION

On a bicycle, the cassette comprises a series of sprockets which attach to a hub driver of the rear wheel. The cassette comprises a series of appropriately sized sprockets which are typically chosen for a specific riding style and/or a riding location. For example, a cassette with a series of smaller sprockets is useful for fast riding and in a flatter location, while a cassette with a series of larger sprockets can be useful for climbing and in a hilly location. The cassette with the desired number and size of sprockets is typically attached to the hub driver body using a locking ring for securing the whole cassette to the hub.

SUMMARY OF THE INVENTION

A bicycle cassette comprises two segments that are attached together thereby forming a composite cassette that can be attached to a rear bicycle hub driver body. The bicycle cassette allows for the use of a smaller sprocket on one segment of the cassette because the smaller sprockets can overhang the hub driver body. Specifically, the cassette allows a small 9 or 10 tooth sprocket to overhang the cassette driver body on the bicycle hub by attaching a small sprocket assembly to a larger sprocket assembly using a locking, bayonet style attachment.

In one embodiment, a bicycle cassette comprises a large sprocket assembly and a small sprocket assembly, wherein the small sprocket assembly rotatably couples with and locks to the large sprocket assembly to form the bicycle cassette. In some embodiments, the small sprocket assembly coupled to the large sprocket assembly using a locking bayonet style attachment. In some embodiments, the small sprocket couples with one or more locking flanges of the large sprocket assembly. In some embodiments, the small sprocket assembly comprises a 9 tooth sprocket and the large sprocket assembly comprises a 42 tooth sprocket. In further embodiments, the small sprocket assembly comprises a 9 tooth sprocket and the large sprocket assembly comprises a 44 tooth sprocket. The large sprocket assembly and the small sprocket assembly can be manufactured from different materials. For example, in some embodiments the larger sprocket assembly is manufactured from aluminum and the small sprocket assembly is manufactured from one of steel and titanium. In some embodiments, the bicycle cassette attaches to a hub driver body using a single locking ring.

In another aspect, a bicycle cassette and hub system comprises a rear bicycle hub, a hub driver assembly coupled to the rear bicycle hub and a cassette assembly coupled to the hub driver assembly, the cassette assembly comprising a large sprocket assembly and a small sprocket assembly, wherein the small sprocket assembly rotatably couples with and locks to the large sprocket assembly to form the bicycle cassette assembly. In some embodiments, the large sprocket assembly is slid onto the hub driver assembly and secured with a locking ring. In some embodiments, a sprocket of the small sprocket assembly overhangs an end of the hub driver assembly. In some embodiments, the small sprocket assembly coupled to the large sprocket assembly using a locking bayonet style attachment. In some embodiments, the small sprocket couples with one or more locking flanges of the large sprocket assembly. In some embodiments, the small sprocket assembly comprises a 9 tooth sprocket and the large sprocket assembly comprises a 42 tooth sprocket. In further embodiments, the small sprocket assembly comprises a 9 tooth sprocket and the large sprocket assembly comprises a 44 tooth sprocket. The large sprocket assembly and the small sprocket assembly can be manufactured from different materials. For example, in some embodiments the larger sprocket assembly is manufactured from aluminum and the small sprocket assembly is manufactured from one of steel and titanium.

In a further aspect, a method of attaching a bicycle cassette to a hub comprises sliding a large sprocket assembly onto a hub driver body to engage the large sprocket assembly to the hub, locking the large sprocket assembly onto the hub, sliding a small sprocket assembly onto the hub driver body and attaching the small sprocket assembly to the large sprocket assembly to form the bicycle cassette. In some embodiments, the small sprocket assembly rotatably couples with and locks to the large sprocket assembly to form the bicycle cassette. In some embodiments, the small sprocket assembly couples to the large sprocket assembly using a locking bayonet style attachment.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the invention are directed to bicycle cassette comprising two segments that are attached together thereby forming a composite cassette that can be attached to a rear bicycle hub driver body. The bicycle cassette allows for the use of a smaller sprocket on one segment of the cassette because the smaller sprockets can overhang the hub driver body. Specifically, the cassette allows a small 9 or 10 tooth sprocket to overhang the cassette driver body on the bicycle hub by attaching a small sprocket assembly to a larger sprocket assembly using a locking, bayonet style attachment.

Reference will now be made in detail to implementations of a bicycle cassette with a locking connection as illustrated in the accompanying drawings. The same reference indicators will be used throughout the drawings and the following detailed description to refer to the same or like parts. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
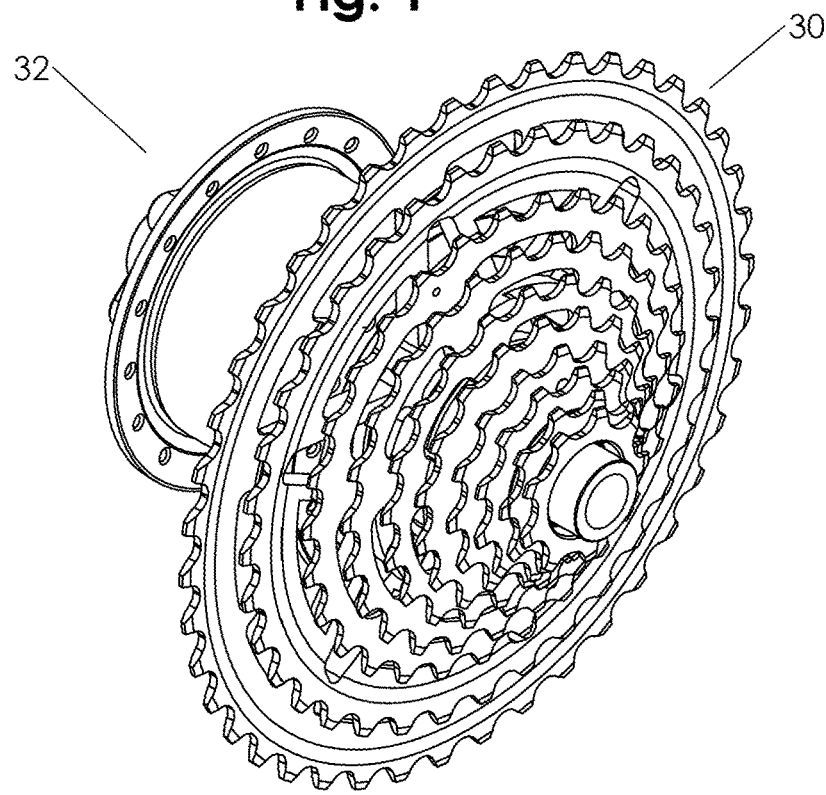
FIG. 1 illustrates an isometric right view of a complete cassette assembly mounted to a rear bicycle hub, in accordance with some embodiments.
Figure 2:
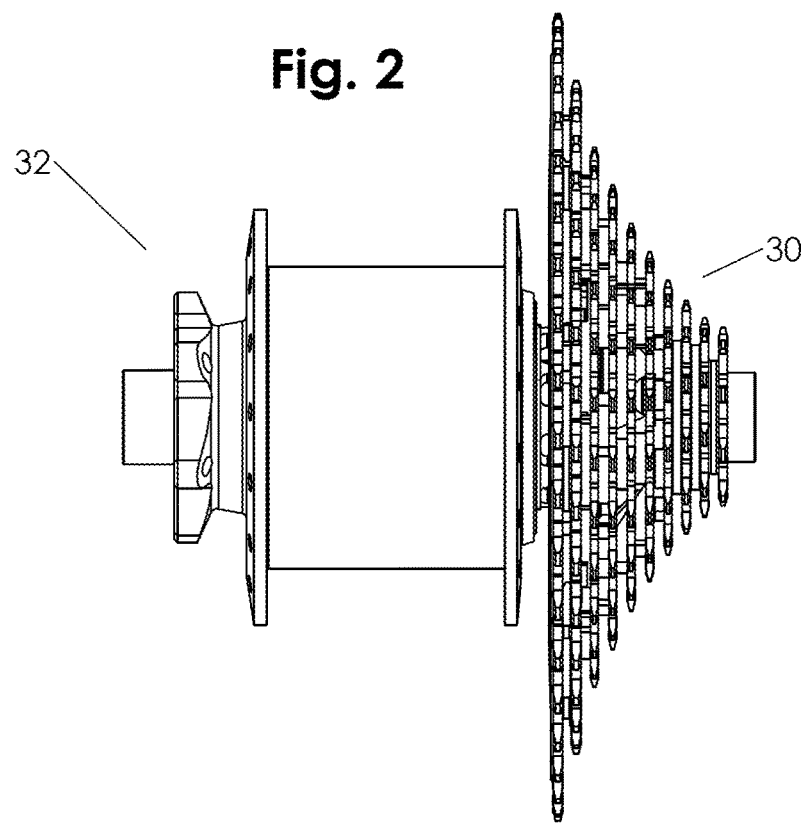
FIG. 2 illustrates a top view of a complete cassette assembly mounted to a rear bicycle hub, in accordance with some embodiments.
Figure 3:
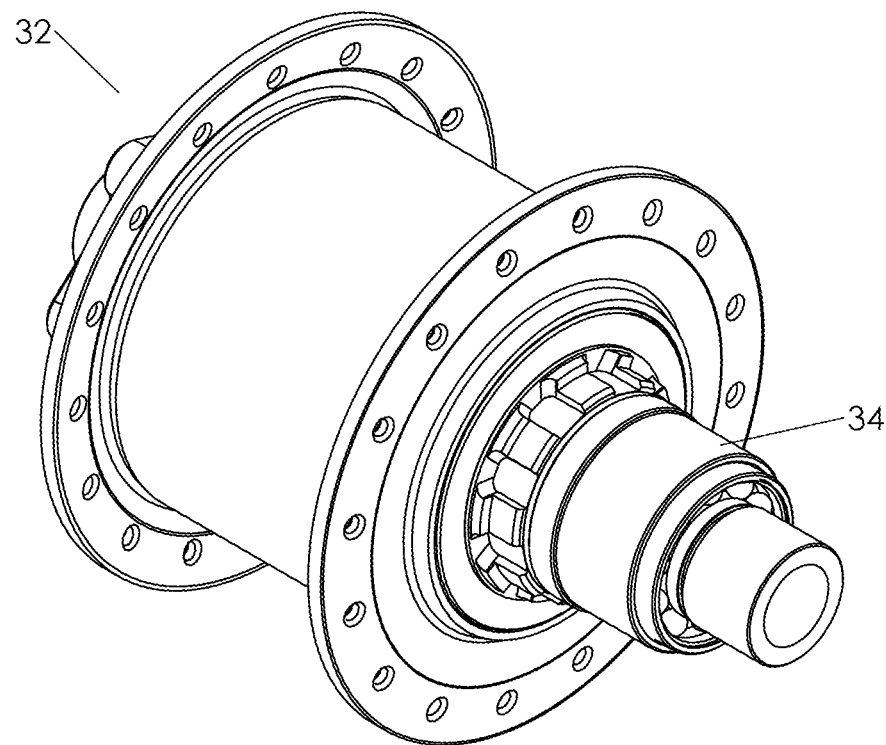
FIG. 3 illustrates an isometric right view of a rear bicycle hub, in accordance with some embodiments.

Referring now to FIGS. 1 and 2, a complete cassette assembly 30 is shown installed on the right side of a rear wheel bicycle hub 32. FIG. 3 shows the rear bicycle hub 32 prior to installation of the complete cassette assembly 30, including the hub driver assembly 34.

Figure 4:
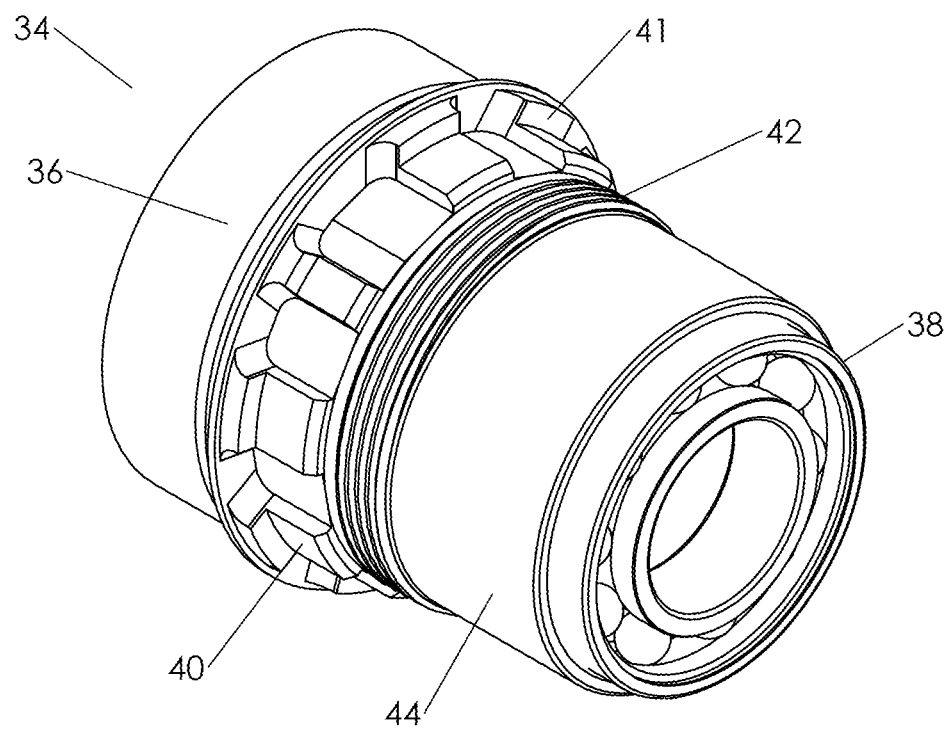
FIG. 4 illustrates an isometric right view of a rear bicycle hub driver, in accordance with some embodiments.

As shown in FIG. 4, the hub driver assembly 34 includes a hub driver body 36, an outboard hub driver bearing 38, a hub driver spline 40, a hub driver cassette stop face 41, a hub driver thread 42 and a hub driver right-end radial surface 44.

Figure 5:
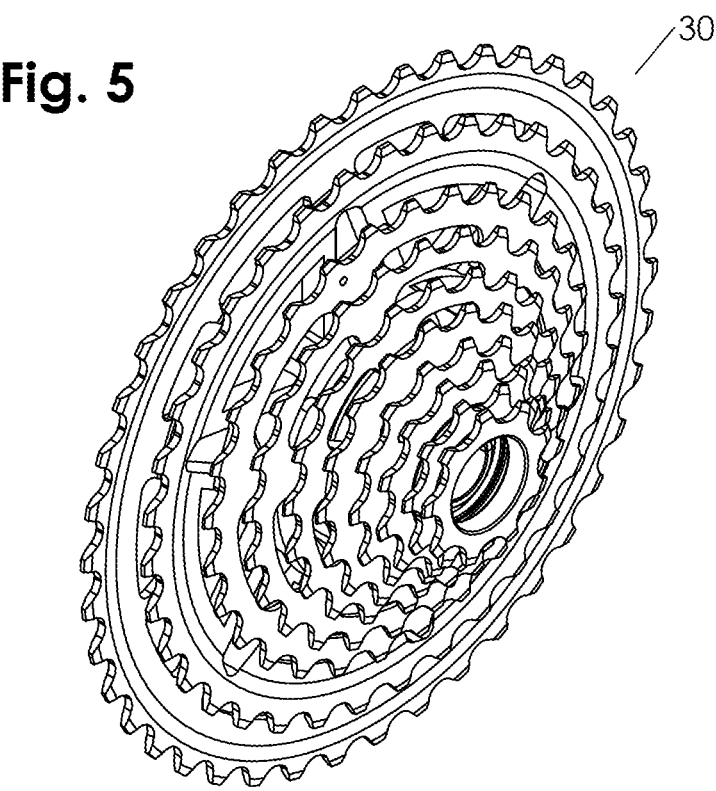
FIG. 5 illustrates an isometric right view of a complete cassette assembly mounted to a hub driver, in accordance with some embodiments.
Figure 6:
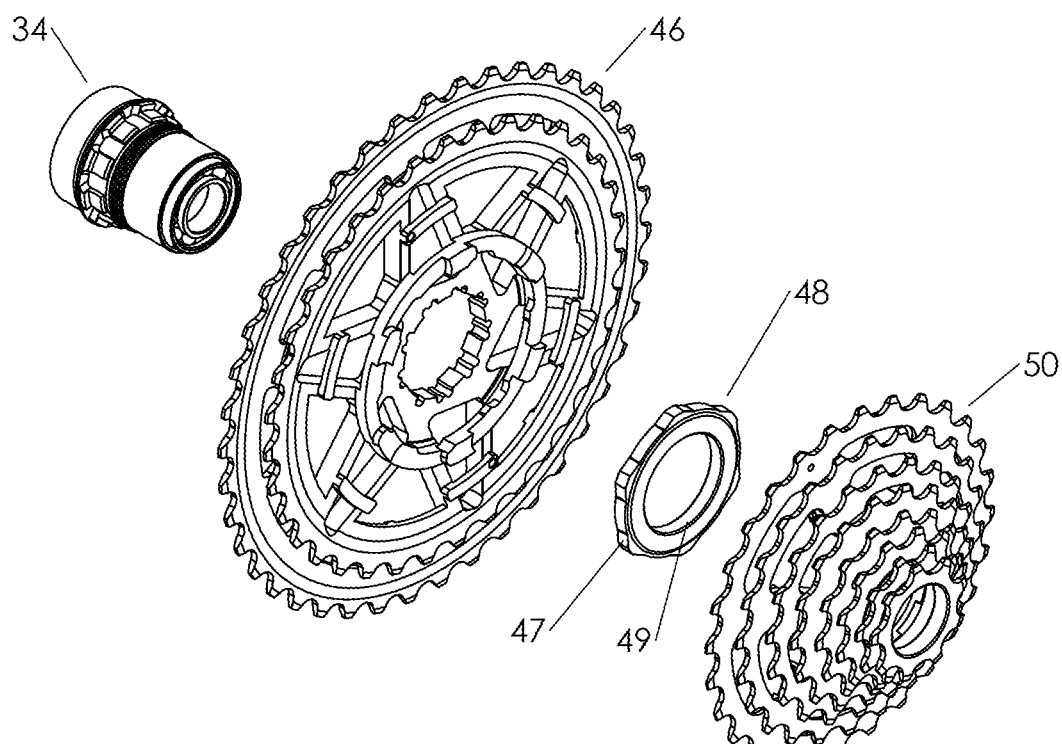
FIG. 6 illustrates an exploded view of a complete cassette assembly mounted to a hub driver, in accordance with some embodiments.

As shown in FIGS. 5 and 6, the complete cassette assembly 30 includes a cassette large sprocket sub-assembly 46, a cassette lock ring 48 which includes a cassette lock ring internal thread 49 and a cassette lock ring external spline 47, and a cassette lock-on sub-assembly 50.

Figure 7:
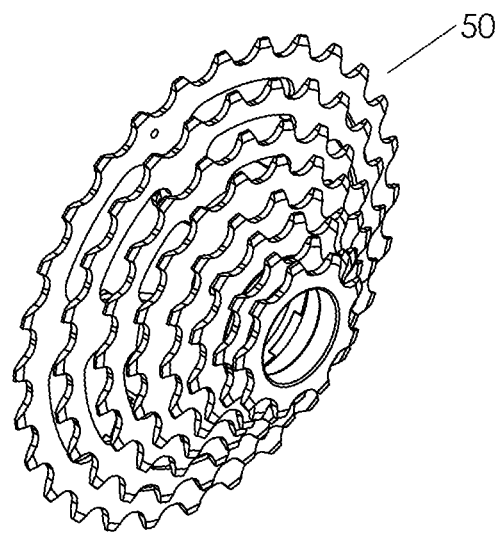
FIG. 7 illustrates an isometric right view of a cassette lock on sub-assembly, in accordance with some embodiments.
Figure 8:
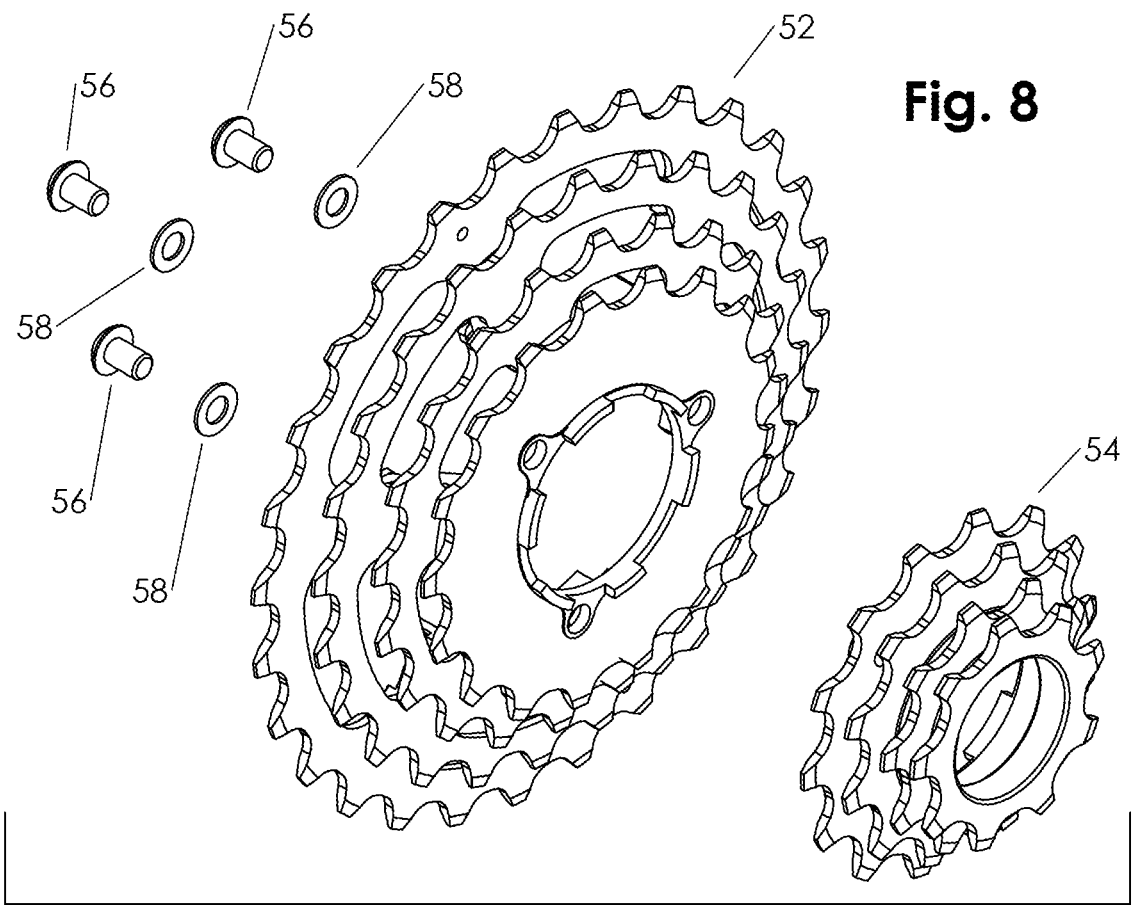
FIG. 8 illustrates an exploded view of a cassette lock on sub-assembly, in accordance with some embodiments.

As shown in FIGS. 7 and 8, the cassette lock-on sub-assembly 50 includes a cassette middle sprocket portion 52 and a cassette small sprocket portion 54. The shown embodiment of the cassette lock-on sub-assembly 50 includes three cassette lock-on sub-assembly fasteners 56 and three cassette lock-on sub-assembly washers 58. In some embodiments, the entire cassette lock-on sub-assembly 50 is manufactured from one piece of material, and the fasteners and torque coupling, such as described below are eliminated.

Figure 9:
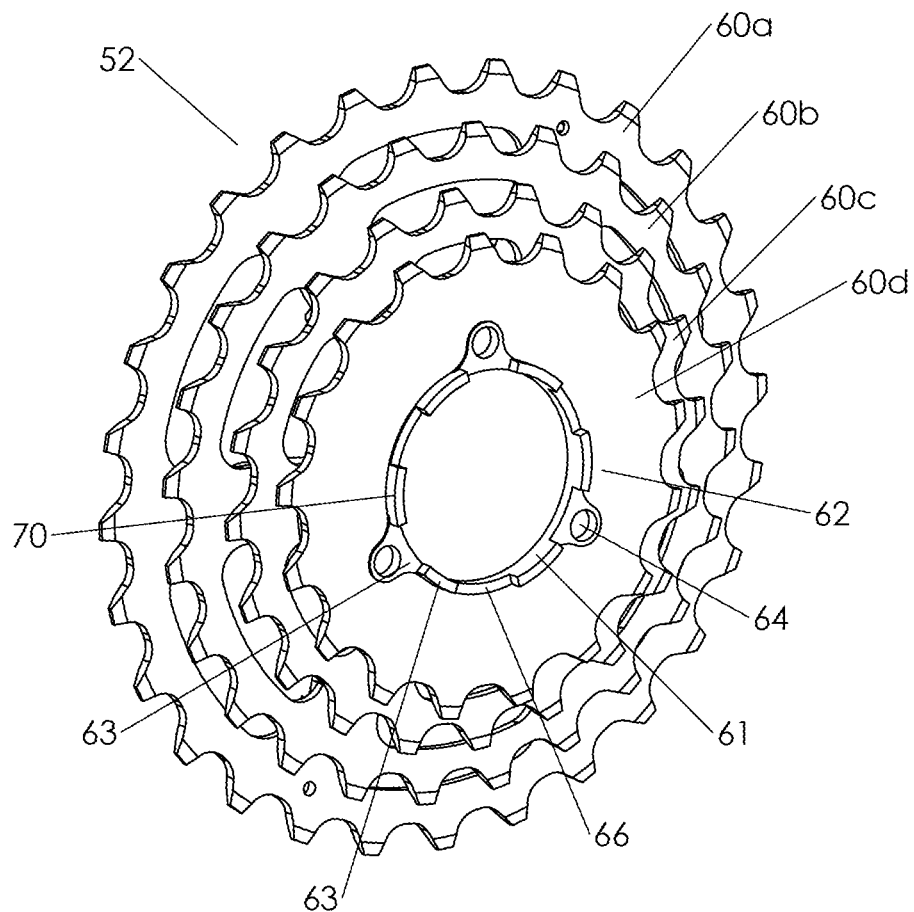
FIG. 9 illustrates an isometric right view of a cassette middle sprocket portion, in accordance with some embodiments.

FIG. 9 shows a cassette middle sprocket portion 52. The cassette middle sprocket portion 52 includes four middle portion sprockets 60a, 60b, 60c, and 60d, a middle sprocket portion inside bore 61 as well as a middle sprocket portion torque coupling 62. The middle portion torque coupling 62 includes a plurality of middle sprocket portion spline teeth 70, a plurality of middle portion spline recesses 66, a plurality of middle sprocket portion through holes 64, and a middle sprocket portion timing tooth 68, of a different width than the middle sprocket portion spline teeth 70.

Figure 10:
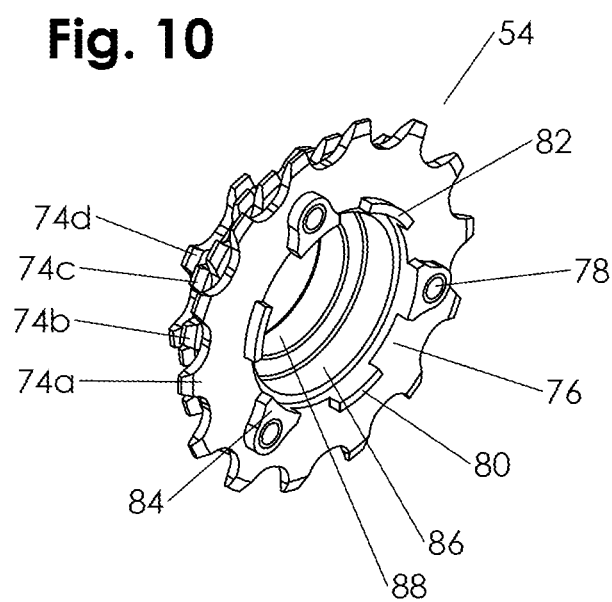
FIG. 10 illustrates an isometric left view of a cassette small sprocket portion, in accordance with some embodiments.

FIG. 10 shows a cassette small sprocket portion 54, which includes four small portion sprockets 74a, 74b, 74c, 74d, a small sprocket portion torque coupling 76, a small sprocket portion locating bore 86 and a small sprocket portion axle clearance hole 88. The small sprocket portion torque coupling 76 includes a plurality of small sprocket portion threaded holes 78, a plurality of small sprocket portion spline teeth 80, and small sprocket portion timing tooth 82. The small sprocket portion 54 also includes a small sprocket portion axial locating face 84.

The small sprocket portion timing tooth 82 will only engage the middle sprocket portion spline recesses 66 adjacent the middle sprocket portion timing tooth 68. The co-location of the timing teeth ensures that the sprockets on the cassette small sprocket portion 54 and the cassette middle sprocket portion 52 are properly aligned in use.

Figure 11:
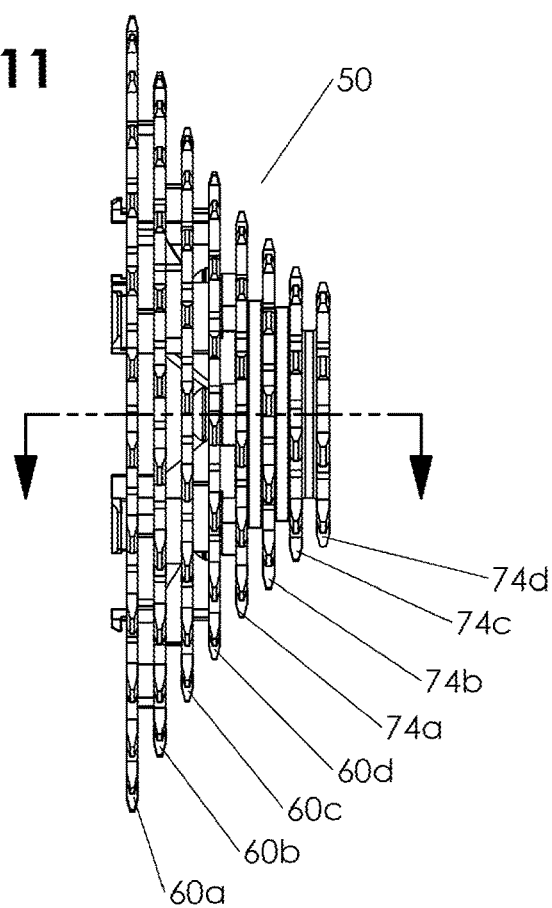
FIG. 11 illustrates a top view of a cassette lock-on sub-assembly, in accordance with some embodiments.

FIG. 11 shows a right side view of the cassette lock-on sub-assembly 50, including the small portion sprockets 74*a*, 74*b*, 74*c*, 74*d*, and said middle portion sprockets 60*a*, 60*b*, 60*c*, 60*d*.

Figure 12:
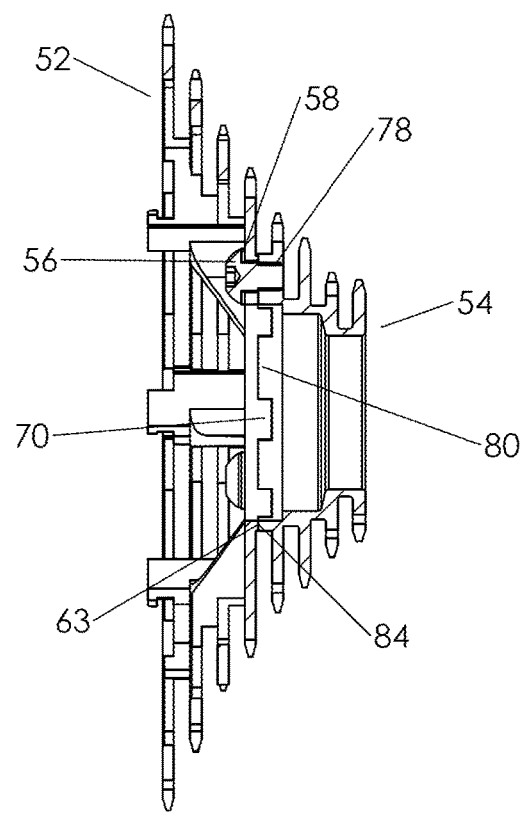
FIG. 12 illustrates a section view of a cassette lock-on sub assembly, in accordance with some embodiments.

FIG. 12 shows a cross section of the cassette lock-on sub-assembly 50. The cassette lock-on sub-assembly fastener 56 passes through the cassette lock-on sub-assembly washer 58 and threads into the small sprocket portion threaded hole 78. The middle sprocket portion spline teeth 70 engage with the small sprocket portion spline teeth 80, and the middle sprocket portion axial location face 63 is pressed to the small sprocket portion axial location face 84.

Figure 13:
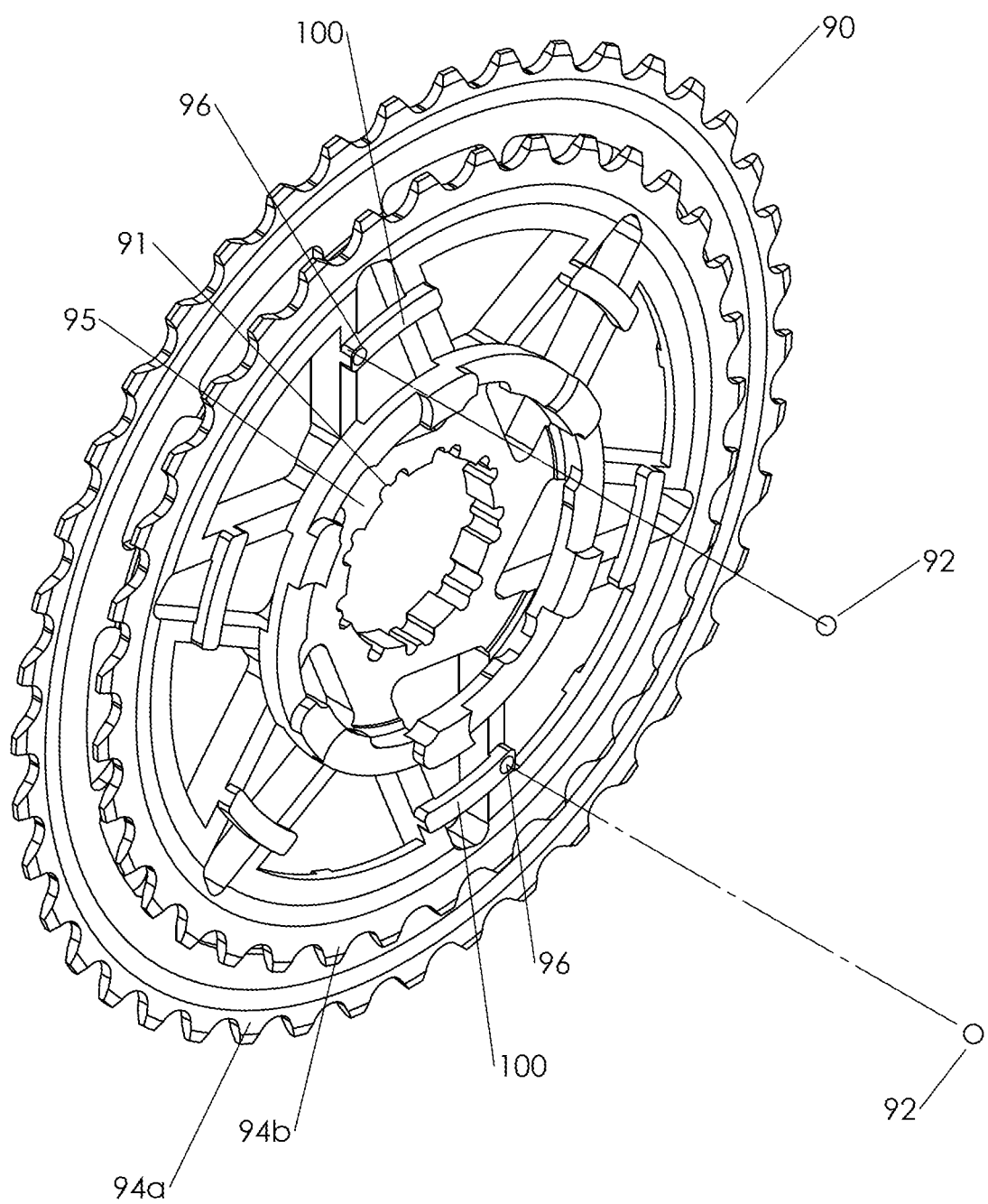
FIG. 13 illustrates an exploded view of a cassette large sprocket sub-assembly, in accordance with some embodiments.

FIG. 13 shows an exploded view of the cassette large sprocket sub-assembly 46, which includes the large sprocket portion 90 and two large portion sprockets 94*a* and 94*b*. Said large sprocket portion includes a large sprocket hub driver spline 91 and a large sprocket lock ring pressure face 95. Two detent balls 92 are shown aligned with their respective detent ball pockets 96.

Figure 14:
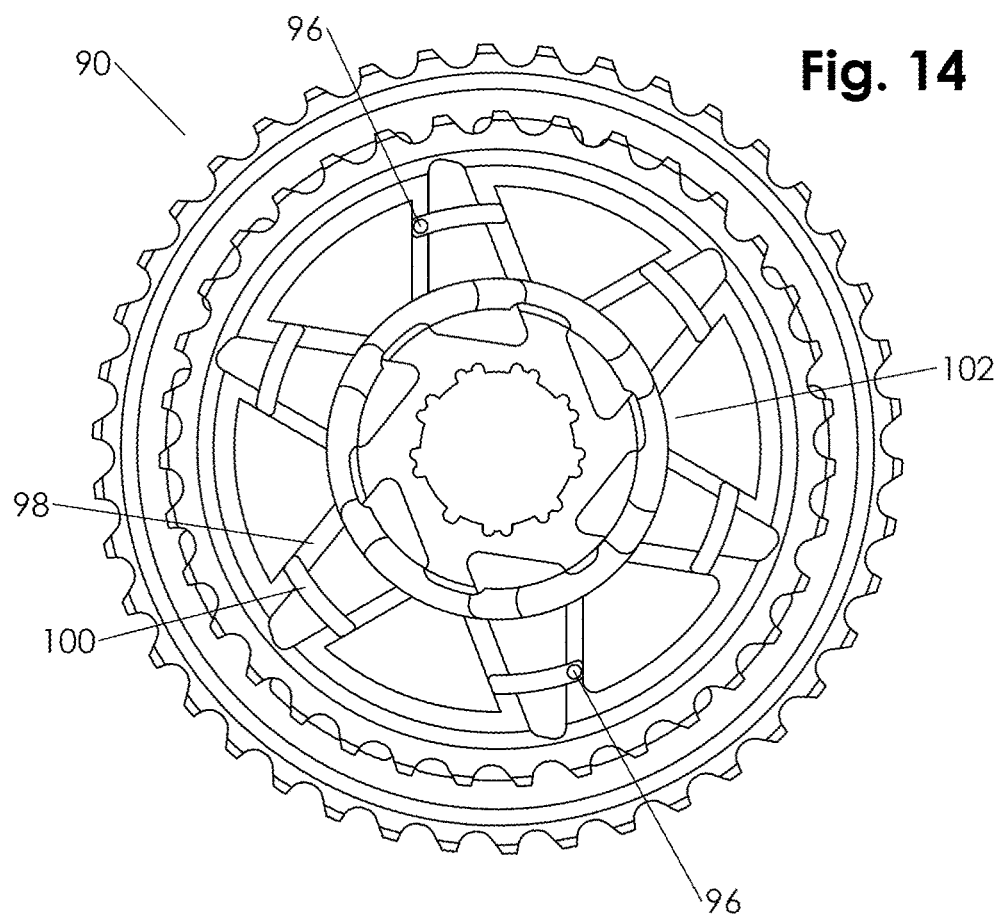
FIG. 14 illustrates a right side view of a cassette large sprocket sub-assembly, in accordance with some embodiments.

FIG. 14 shows a right side view of the large sprocket portion 90, including the large sprocket portion spokes 98. It also shows the large sprocket primary torque coupling 102.

Figure 15:
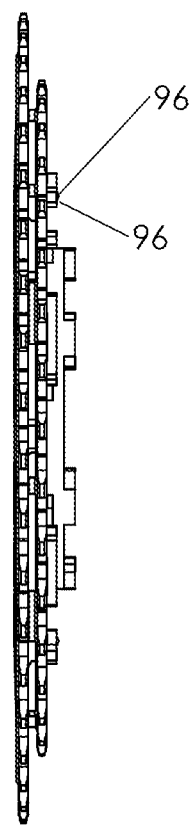
FIG. 15 illustrates a rear view of a cassette large sprocket portion, in accordance with some embodiments.

FIG. 15 shows a rear view of the large sprocket portion 90, including the detent balls 96, and the detent ball protrusion distance 97. The detent balls 92 are assembled by pressing the balls to the proper depth into said detent ball pockets 96 so that they are left protruding from the surface of the middle sprocket offset pads 100 by the detent ball protrusion distance 97.

Figure 16:
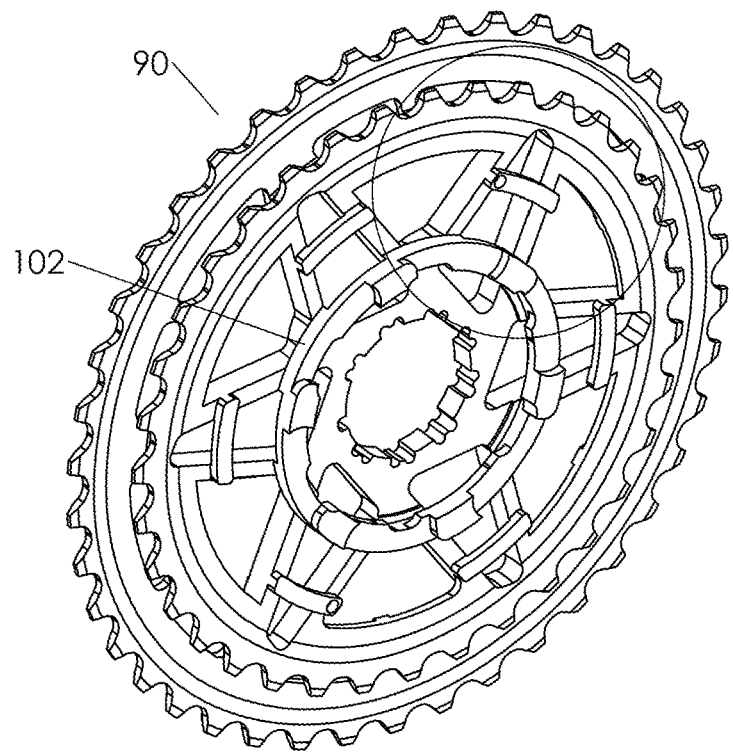
FIG. 16 illustrates an isometric right view of a cassette large sprocket sub-assembly, in accordance with some embodiments.
Figure 17:
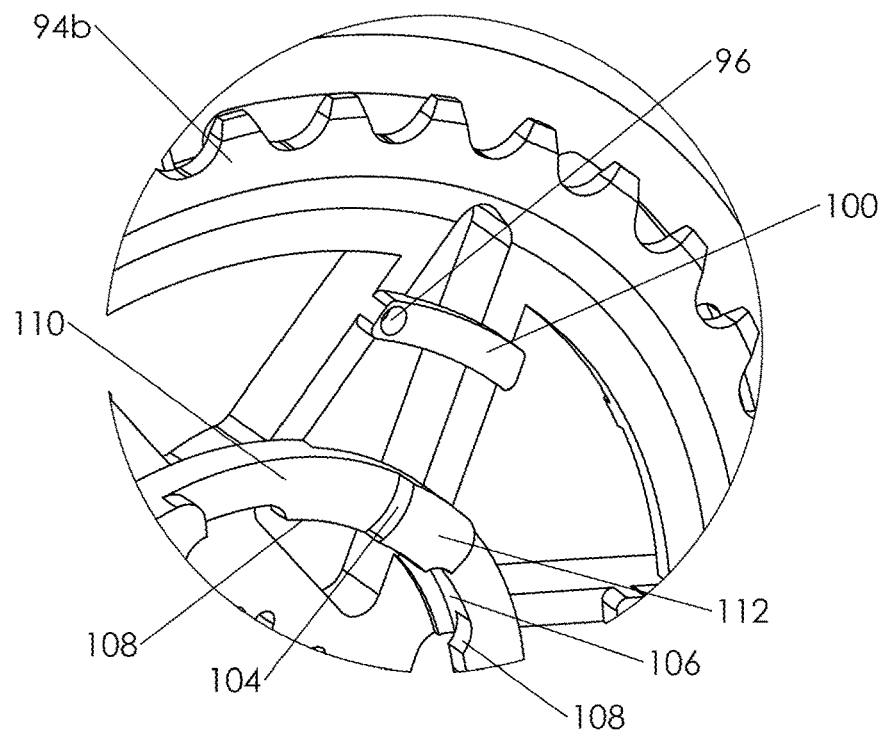
FIG. 17 illustrates a detail view of a cassette large sprocket sub-assembly, in accordance with some embodiments.

FIGS. 16 and 17 give two additional views of the large sprocket portion 90, and including features of the large sprocket primary torque coupling 102. The large sprocket primary torque coupling 102 includes a repeated pattern of several features, including a torque receiving face 104, locking flange cutout 106, locking flange 108, primary coupling axial location face 110, and primary coupling torque boss 112.

Figure 18:
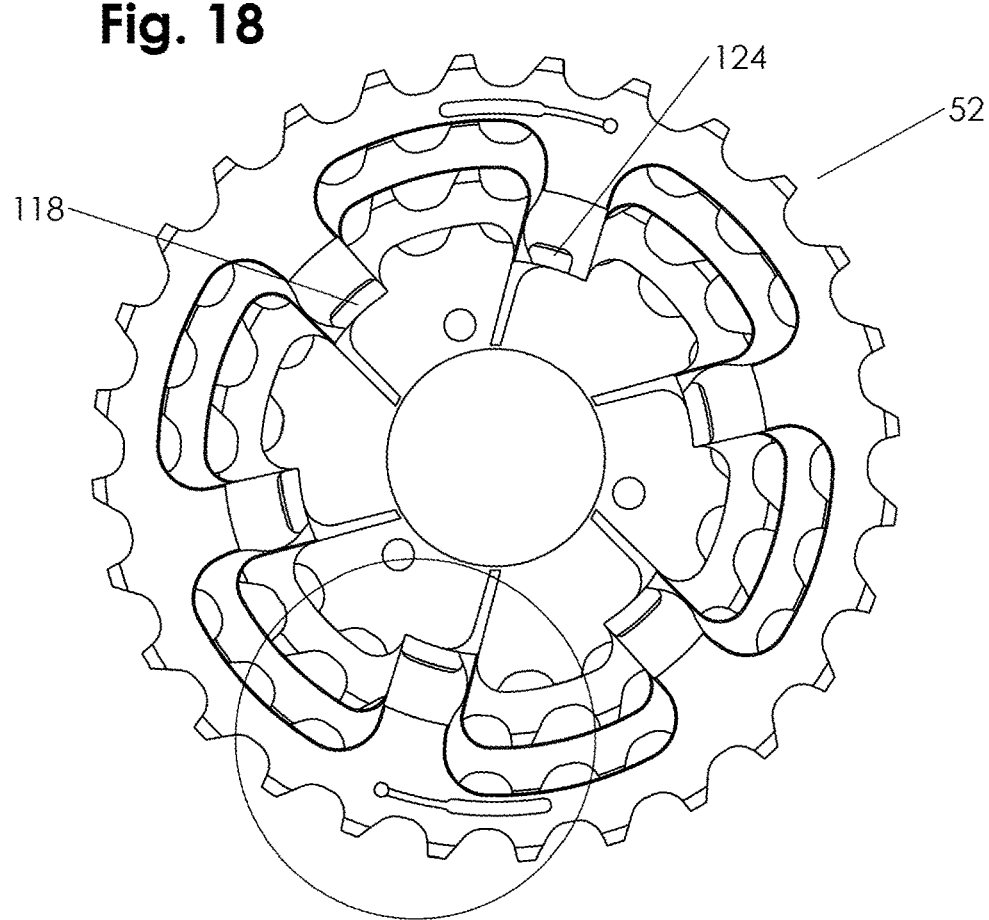
FIG. 18 illustrates a left side view of a cassette middle sprocket portion, in accordance with some embodiments.
Figure 19:
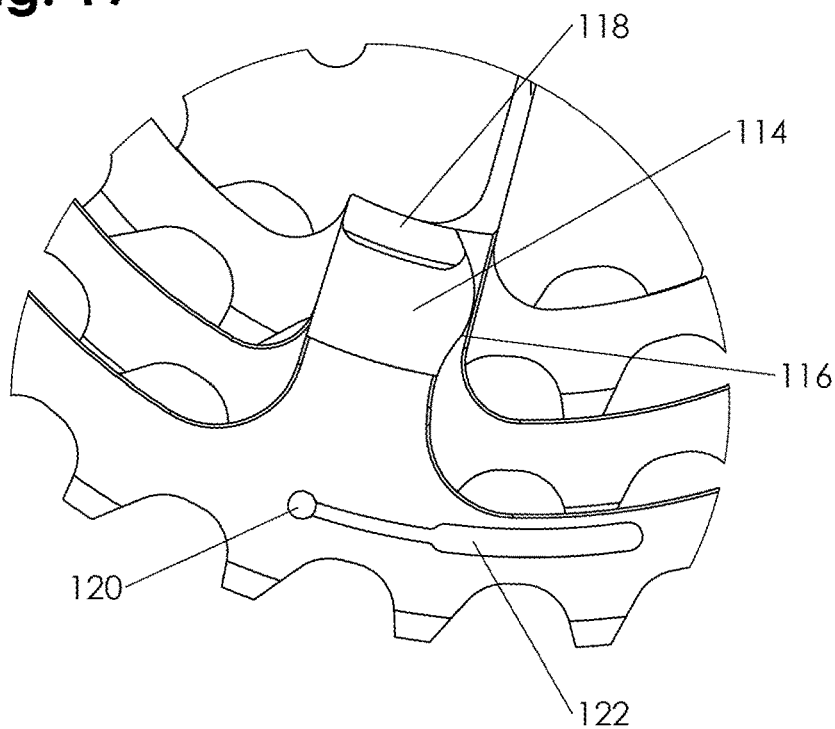
FIG. 19 illustrates a left side detail view of a cassette middle sprocket portion, in accordance with some embodiments.

FIGS. 18 and 19 show two views of the cassette middle sprocket portion 52, including a repeating pattern of a middle sprocket driving bosses 114, which includes a torque driving face 116 and a locking tang 118. The portion also includes a detent ball relief slot 122 and a detent ball locking hole 120.

Figure 20:
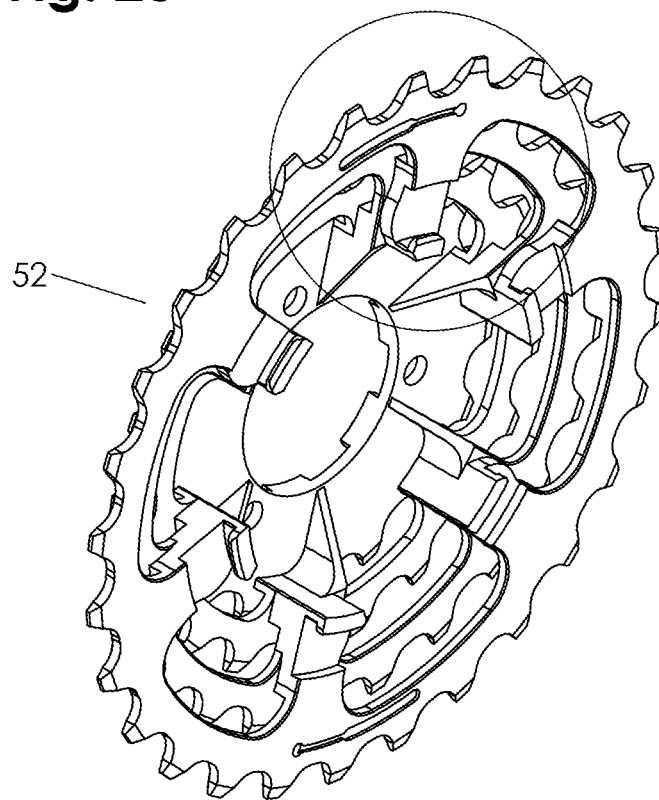
FIG. 20 illustrates a left isometric view of a cassette middle sprocket portion, in accordance with some embodiments.
Figure 21:
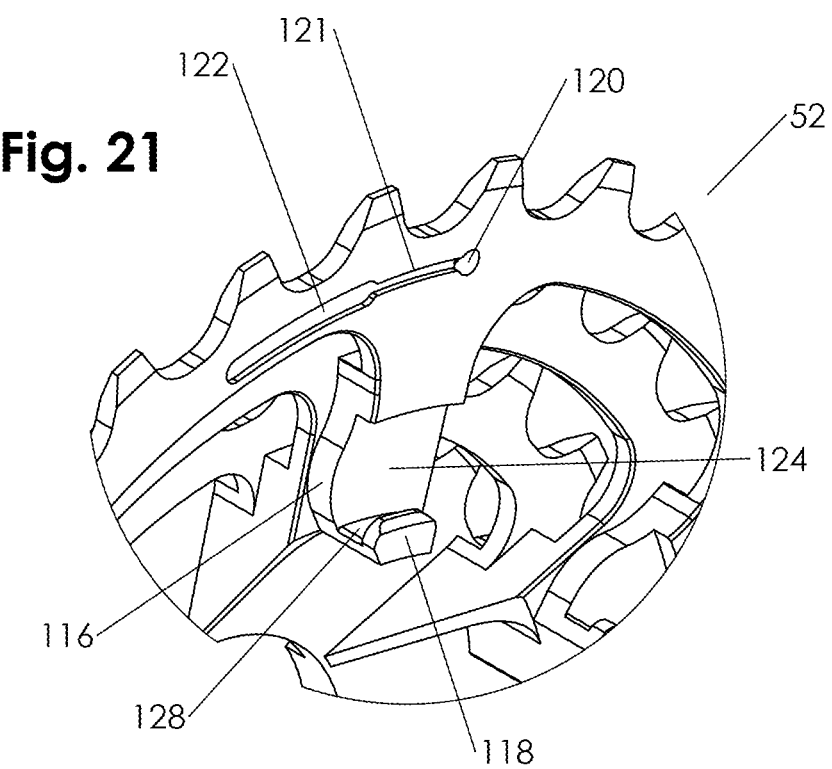
FIG. 21 illustrates a left isometric detail view of a cassette middle sprocket portion, in accordance with some embodiments.

FIGS. 20 and 21 give additional views of the middle sprocket driving boss 114, showing the entirety of the torque driving face 116 and the driving boss axial pad 124. FIG. 20 also shows another view of the locking tang 118, and the locking tang axial clearance 128.

Figure 22:
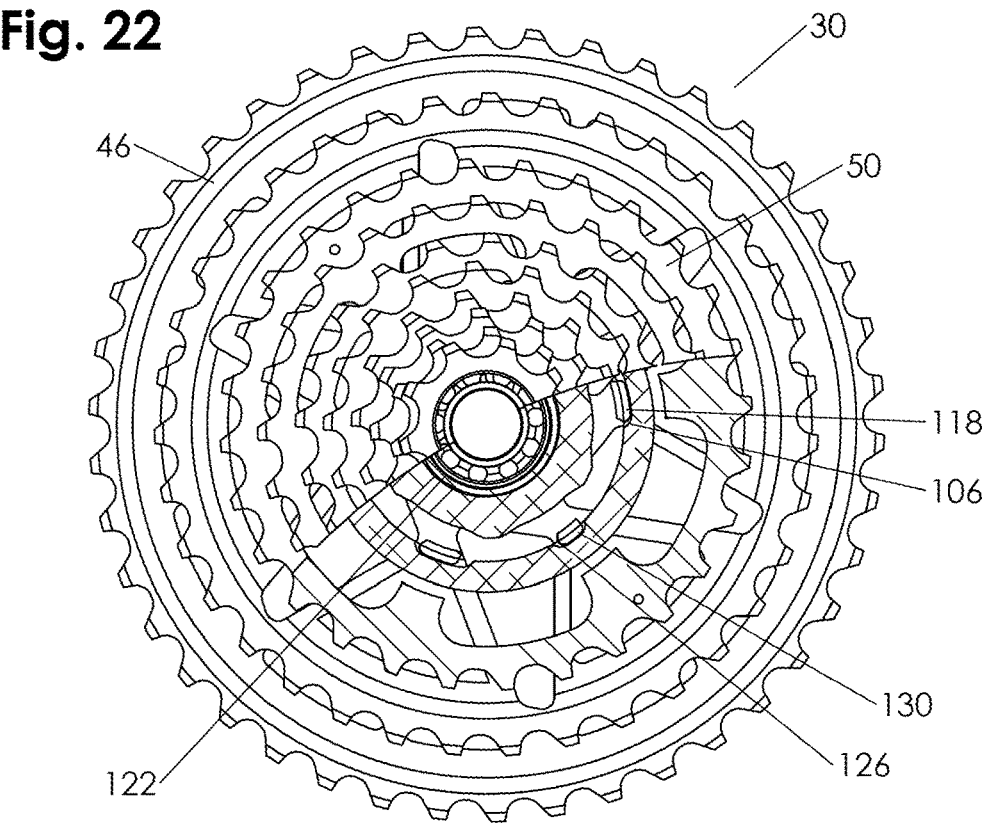
FIG. 22 illustrates a right side breakout section view of a complete cassette assembly in an unlocked position, in accordance with some embodiments.

FIG. 22 shows a broken out section view of the complete cassette assembly 30 with the cassette large sprocket sub-assembly 46 and the cassette lock-on sub-assembly 50 in the unlocked, installation position. In this orientation, the locking tangs 118 are aligned with the locking flange cutouts 106, so that the cassette lock-on sub-assembly 50 may slide into place on the hub driver assembly 34. Also shown is the primary location locking tang 124 aligned with the primary location locking flange cutout 126. Only the primary location locking tang 124 will fit through the primary location locking flange cutout 126, which ensures that the cassette lock-on sub-assembly 50 will be installed in the correct orientation.

Figure 23:
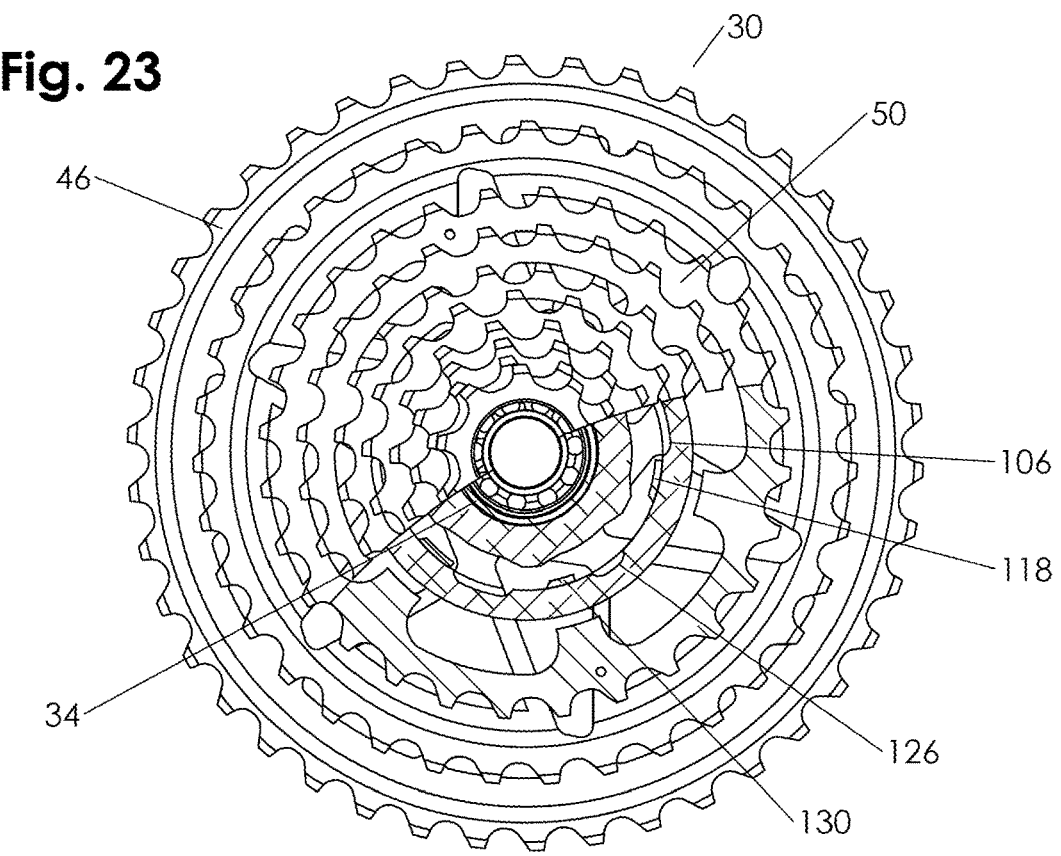
FIG. 23 illustrates a right side breakout section view of a complete cassette assembly in a locked position, in accordance with some embodiments.

FIG. 23 shows the same broken-out section view with the cassette lock-on sub-assembly 50 rotated clockwise approximately 22 degrees so that the sub-assembly is locked to the cassette large sprocket sub-assembly 46. In this orientation the locking tang axial clearance 128 locates the locking tang pad 124 on one side of the locking flange 108, and the locking tang 118 on the opposite side of the locking flange 108, with locking tang axial clearance 128 adequate to allow the cassette lock-on sub-assembly 50 to rotate and lock to the cassette large sprocket sub-assembly 46.

Figure 24:
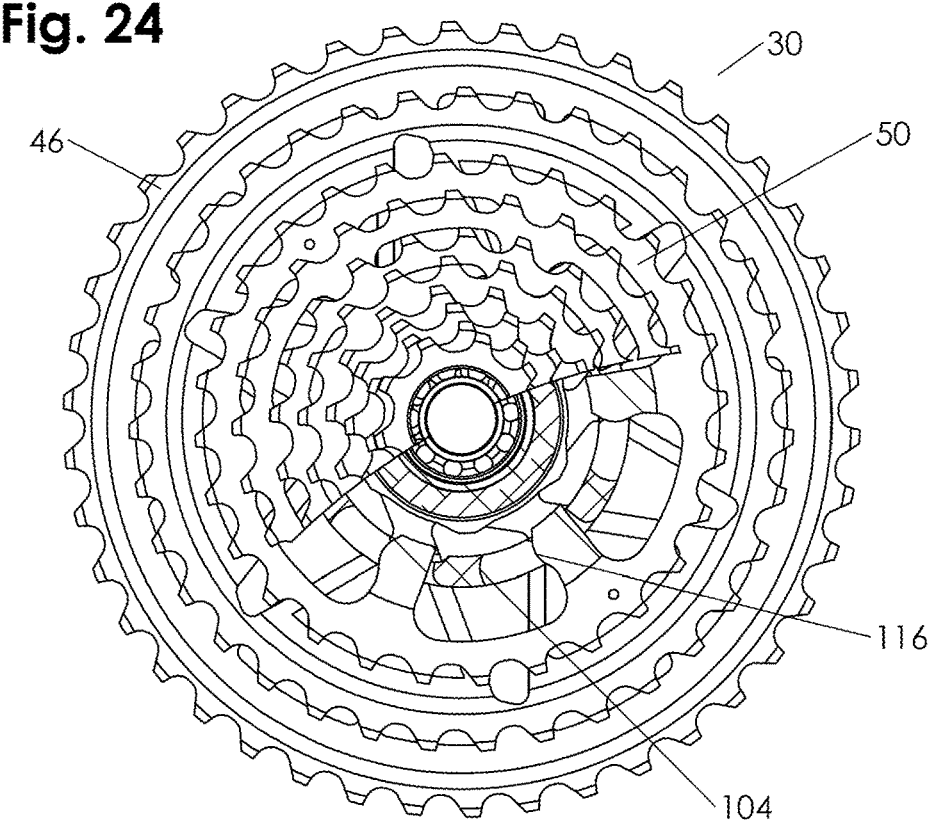
FIG. 24 illustrates a right side breakout section view of a complete cassette assembly in an unlocked position, in accordance with some embodiments.

FIG. 24 shows another broken out section view of the complete cassette assembly 30 with the cassette large sprocket sub-assembly 46 and the cassette lock-on sub-assembly 50 in the unlocked, installation position. In this view, the torque driving face 116 is not yet in contact with the torque receiving face 104.

Figure 25:
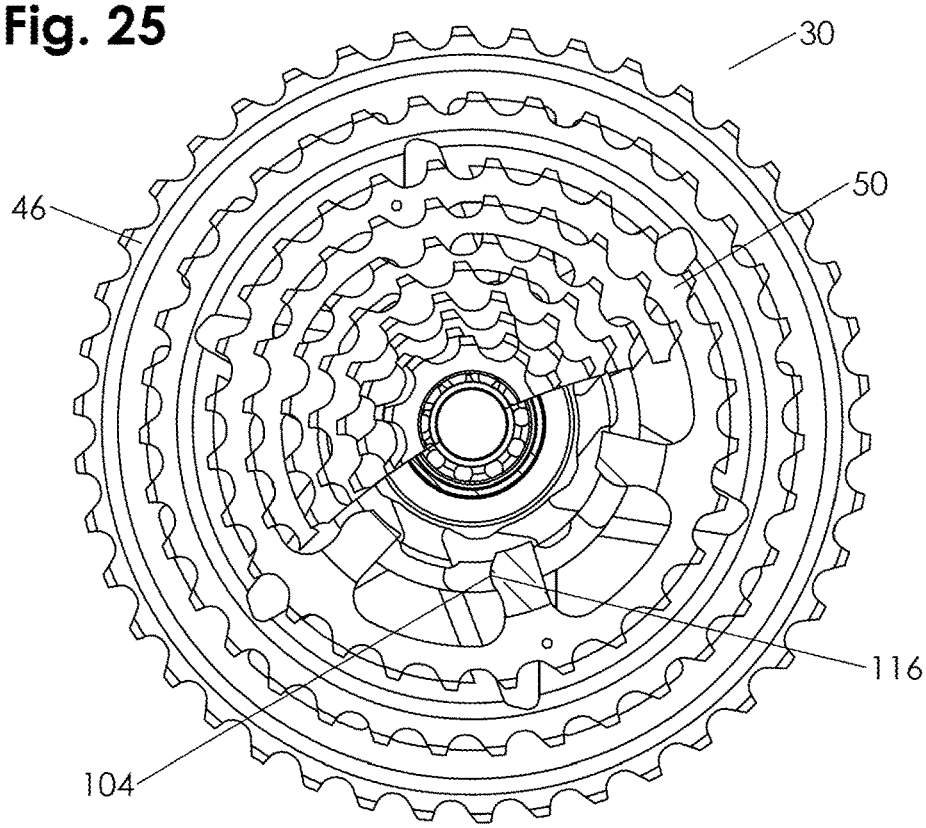
FIG. 25 illustrates a right side breakout section view of a complete cassette assembly in a locked position, in accordance with some embodiments.

FIG. 25 shows the same broken out section view as FIG. 23 of the complete cassette assembly 30 with the cassette large sprocket sub-assembly 46 and the cassette lock-on sub-assembly 50 rotated clockwise into the locking position. In this view, the torque driving face 116 is in contact with the torque receiving face 104.

Figure 26:
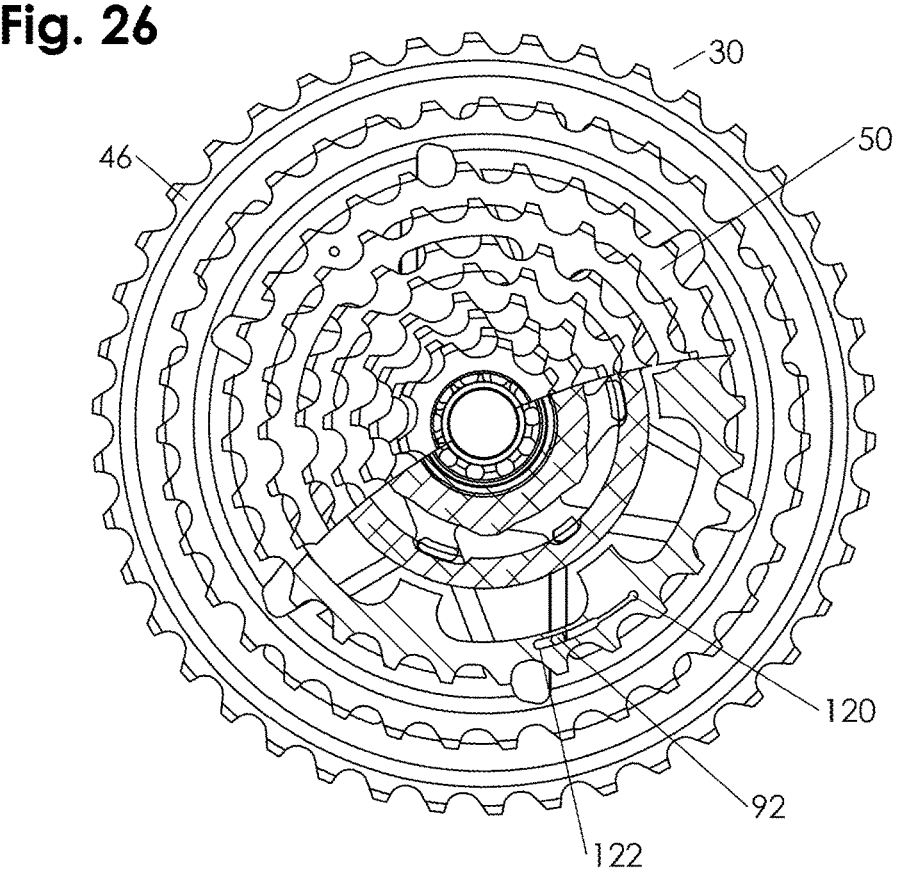
FIG. 26 illustrates a right side breakout section view of a complete cassette assembly in an unlocked position, in accordance with some embodiments.

FIG. 26 shows another broken out section view of the complete cassette assembly 30 with the cassette large sprocket sub-assembly 46 and the cassette lock-on sub-assembly 50 in the unlocked, installation position. The detent ball relief slot 122, detent ball locking hole 120 and detent ball slide groove 121 are shown. In this position, the detent ball 92 engages the detent ball relief slot 122. In the shown embodiment the detent ball relief slot 122 should be deep enough to allow the cassette lock-on sub assembly to fully rest against the cassette large sprocket sub-assembly 46 with no interference, where the middle sprocket driving boss 114 presses against the primary coupling axial location face 110.

Figure 27:
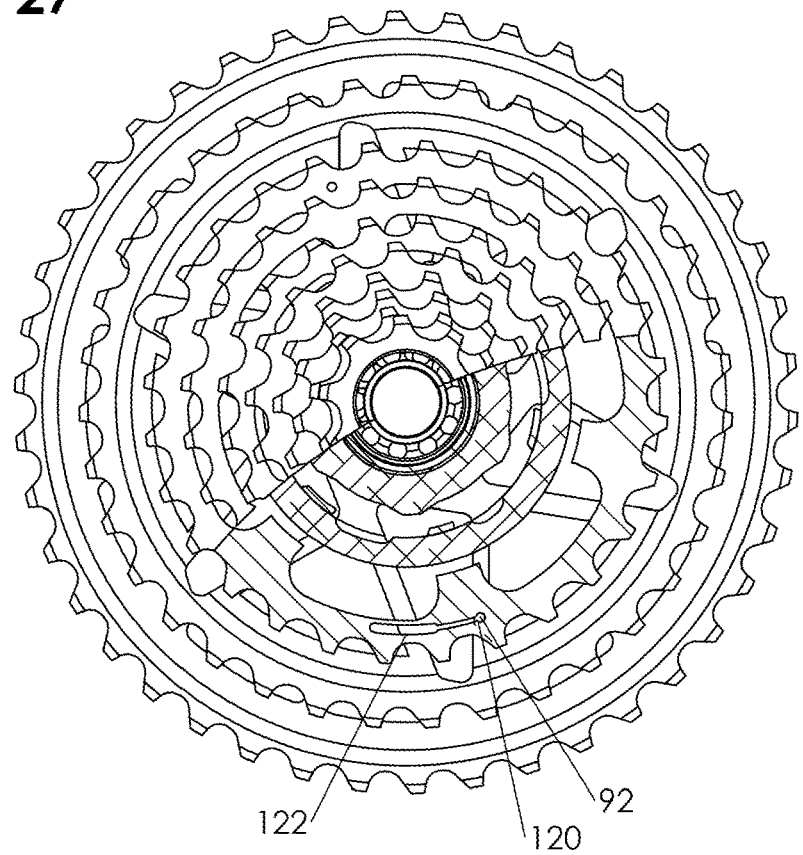
FIG. 27 illustrates a right side breakout section view of a complete cassette assembly in a locked position, in accordance with some embodiments.

FIG. 27 shows the same broken out section view as FIG. 24 of the complete cassette assembly 30 with the cassette large sprocket sub-assembly 46 and the cassette lock-on sub-assembly 50 rotated clockwise into the locking position. In this position, the detent ball 92 snaps into the detent ball locking hole 120, preventing the cassette lock-on sub-assembly 50 from rotating clockwise and disengaging from the cassette large sprocket sub-assembly 46 during use.

Figure 28:
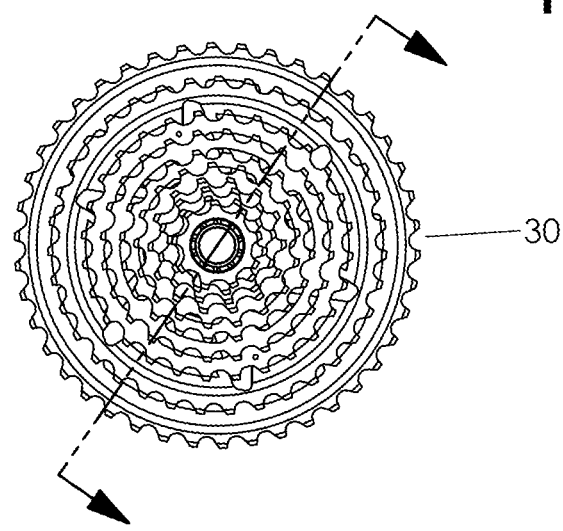
FIG. 28 illustrates a right side view of a complete cassette assembly mounted to a hub driver, in accordance with some embodiments.

FIG. 28 shows a right side view of the complete cassette assembly 30 mounted to a hub driver.

Figure 29:
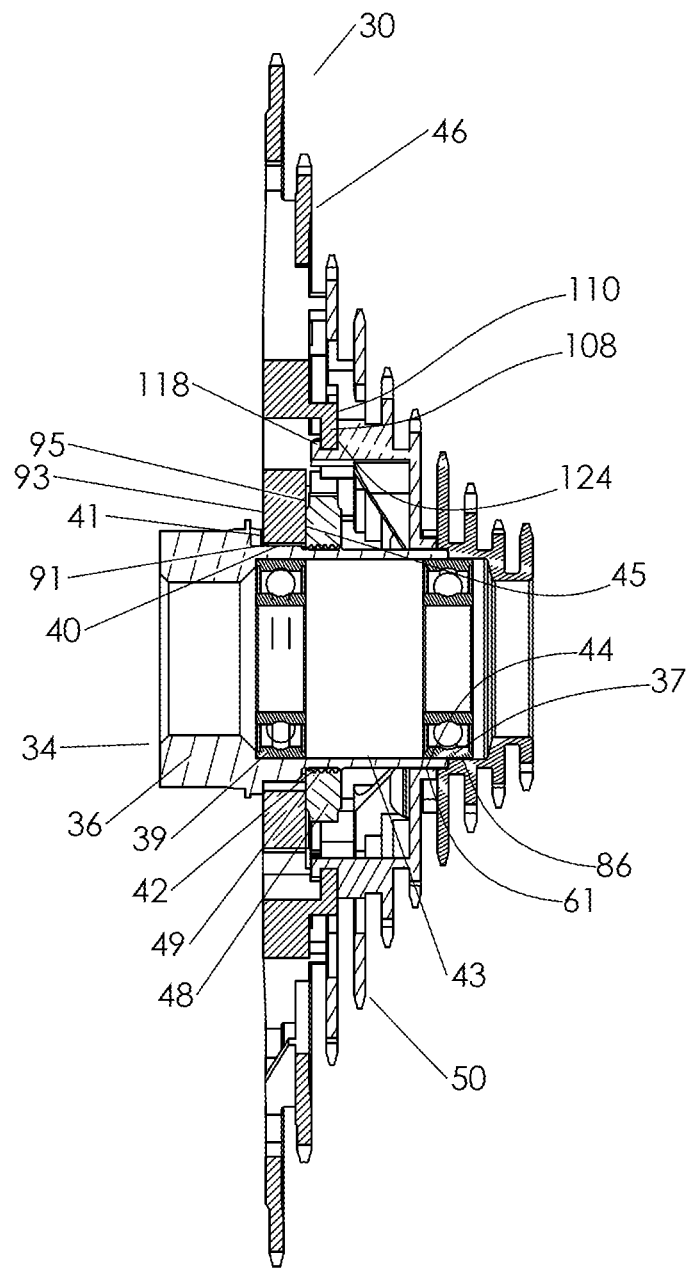
FIG. 29 illustrates a section view of a complete cassette assembly mounted to a hub driver, in accordance with some embodiments.

FIG. 29 shows a cross section of the complete cassette assembly 30 mounted to the hub driver assembly 34. Shown in the cross section are some of the critical features of the complete cassette assembly 30 in their mounted and locked configuration. The assembly is built up on the hub driver assembly 34, which includes a hub driver body 36. Two bearings, the outboard hub driver bearing 38 and inboard hub driver bearing 39 are fitted in the inner hub driver bearing bore 43.

The large sprocket portion 90 is fitted onto the hub driver body 36 so that the large sprocket hub driver spline 91 engages the hub driver spline 40, and the large sprocket spline stop face 93 contacts the hub driver cassette stop face 41. The cassette lock ring 48 is threaded onto the hub driver body 36 so that the cassette lock ring internal thread 49 engages the hub driver thread 42, and the cassette lock ring pressure face 45 contacts the large sprocket lock ring pressure face 95.

The cassette lock-on sub-assembly 50 is installed on the cassette large sprocket sub-assembly 46 and the hub driver assembly 34, so that the middle sprocket portion inside bore 61 rests on the hub driver right-end radial surface 44, and the small sprocket portion locating bore 86 rests on the outboard hub bearing outer race 37.

The locking tang 118 is engages with the locking flange 108, such that the locking tang pad 124 is in contact with the primary coupling axial location face 110.

In operation, the complete cassette assembly 30 can be easily assembled onto a rear bicycle hub 32 using common tools well known to bicycle mechanics and others familiar with bicycle construction and assembly. For example, in some embodiments, the tools needed for assembly of the complete cassette assembly 30 are a chain whip and a hex socket and wrench. The hex socket or other similar tool should be of such a size as to fit the cassette lock ring external spline 47.

To assemble the complete cassette assembly 30, the cassette large sprocket sub-assembly 46 slides over the hub driver right-end radial surface 44 towards the left end of the rear bicycle hub 32 until the large sprocket hub driver spline 91 is engaged with the hub driver spline 40. The large sprocket spline stop face 93 is pressed against the hub driver cassette stop face 41.

Once the cassette large sprocket sub-assembly 46 is completely engaged on the hub, the cassette lock ring 48 is threaded onto the hub driver thread 42, until the cassette lock ring pressure face 45 is pressed against the large sprocket lock ring pressure face 95. In some embodiments, the cassette lock ring 48 is contained inside the large sprocket primary torque coupling 102. The cassette lock ring 48 is tightened to an appropriate torque value using the hex socket and wrench.

After tightening the cassette lock ring 48, the cassette lock-on sub-assembly 50 is installed. The middle sprocket portion inside bore 61 is aligned with the hub driver right-end radial surface 44, and the primary location locking tang 130 is aligned with the primary location locking flange cutout 126. In this orientation the detent ball(s) 92 are aligned with the detent ball relief slot 122.

After proper alignment, the cassette lock-on sub-assembly 50 slides towards the left end of the rear bicycle hub 32 until the locking tang pad 124 contacts the primary coupling axial location face 110. Once the cassette lock-on sub-assembly 50 is in place, a chain whip is attached to one of the sprockets on the sub-assembly. The chain whip is used to rotate the cassette lock-on sub-assembly in the clockwise direction relative to the cassette large sprocket sub-assembly 46.

As the cassette lock-on sub-assembly 50 is rotated, several events occur to ensure proper attachment of the two pieces. First, the locking tangs 118 begin to engage the locking flanges 108. As the tangs begin to engage the flanges 108, the detent balls 92 move relative to the cassette lock-on sub-assembly 50 in the clearance created by the detent ball relief slot 122. Once the locking tangs 118 have engaged the locking flanges 108, the detent ball moves into the detent ball slide groove 121. During this portion of the motion, there is a small interference between the detent balls 92 and the detent ball slide groove 121. This interference causes the assembly to flex slightly and creates a frictional torque to resist the install torque applied by the chain whip.

At the end of the installation rotation, the detent balls 92 snap into place in the detent ball locking holes 120, and the torque driving faces 116 come into contact with the torque receiving faces 104. At this point the chain-whip is removed, and installation is complete.

To disassemble the cassette lock-on sub-assembly 50 from the cassette large sprocket sub-assembly 46, two chain-whips are employed. One chain-whip is attached to the cassette large sprocket sub assembly 46 to hold it stationary. The second chain-whip is attached to the cassette lock-on sub-assembly 50 and torque is applied in the counter-clockwise direction. Once sufficient torque is applied, the detent balls 92 will pop out of the detent ball locking holes 120, and the cassette lock-on sub-assembly 50 will rotate counter-clockwise until the locking tangs 118 come to the locking flange cutouts 106, and it is possible to remove the sub-assembly from the rear bicycle hub 32.

In use, tension in a bicycle chain applies a clockwise torque to one of the sprockets on the complete cassette assembly 30, including the large portion sprockets 94a, 94b, middle portion sprockets 60a, 60b, 60c, 60d, or small portion sprockets 74a, 74b, 74c, 74d. When torque is applied to the middle portion sprockets or small portion sprockets, the torque is transferred to the cassette large sprocket sub-assembly 46 through the torque driving face 116/torque receiving face 104 interface. The torque is then transferred to the hub driver assembly 34 through the hub driver spline 40/large sprocket hub driver spline 91 interface. The detent balls 92 resting in the detent ball locking holes 120 resist spontaneous disassembly from abnormal chain loads encountered during bicycle ride activity.

As described above, and as shown within the figures, the complete cassette assembly 30 comprises 10 total sprockets. However, the complete cassette assembly 30 can comprise any appropriately desired amount of sprockets. For example, in some embodiments, the complete cassette assembly 30 comprises between 7 and 11 sprockets. Alternatively, in some embodiments, the complete cassette assembly 30 comprises between 12 and 14 sprockets. Additionally, as shown in the figures the smallest sprocket comprises 9 teeth and the largest sprocket comprises 42 teeth. However, the smallest sprocket and the largest sprocket can each comprise any appropriately desired amount of teeth. For example, in some embodiments, the smallest sprocket comprises 9 teeth and the largest sprocket comprises 44 teeth.

In some embodiments, some or all of the sprockets in the cassette assembly 30 are stamped from sheet material and riveted or attached by an appropriate method to a series of central carriers which contain the torque-transferring features of the invention. For example, in some embodiments, steel sprockets are riveted or otherwise fixed to a central aluminum piece to form the cassette large sprocket sub-assembly 46. This same construction method can be used for the other portions of the cassette.

Additionally, in some embodiments, some or all of the sprockets on the cassette middle sprocket portion 52 or the cassette small sprocket portion 54 are manufactured from a different material than the carriers for the sprockets. The cassette middle sprocket portion 52 or the cassette small sprocket portion 54 can be combined with the cassette large sprocket sub-assembly 46 so that one monolithic carrier supports all of the sprockets in the cassette middle sprocket portion 52 and the cassette small sprocket portion 54, thereby eliminating the torque coupling between them.

In another embodiment, the large sprocket portion 90 is combined with the hub driver body 36 and manufactured from one piece of material. In this case, the cassette lock ring 48 can be eliminated, and the assembly is further simplified.

In some other embodiments, the number of repeated circular arrangement of features on the cassette is considered. For instance, while two detent balls 92 are shown within the figures, any appropriately desired number could be used as required. For example, in some embodiments 1 to 6 detent balls are used. However, more can be added as necessary.

Additionally, in some embodiments, the number of torque transferring feature sets (torque receiving face 104/torque driving face 116, locking tangs 118, locking tang pads 124) are increased or decreased as necessary to suit different space constraints and different usage cases, using more features for higher torque loads and less features for less rigorous applications.

Further, many alternative embodiments present themselves with orientation and location of the torque transferring features that pass torque between the lock-on sub-assembly 50 and the cassette large sprocket sub-assembly 46. For instance, the locking tangs 118 can be oriented so that they grip the outside diameter of the locking flange 108, rather than the inside diameter. Alternately, in some embodiments, the locking tangs 118 project from the cassette large sprocket sub-assembly 46, and the locking flange 108 could be located on the lock-on sub-assembly 50.

In addition, the locking mechanism itself can comprise many alternative arrangements. For example, instead of the detent balls 92, spring loaded ball plungers could be substituted. Another alternative locking feature is a leaf spring arrangement whereby a formed leaf spring with a formed tooth is attached to the cassette large sprocket sub-assembly 46, and the tooth acts on a machined feature of the lock-on sub-assembly 50. Another alternative uses a set screw or other locking screw to lock the two pieces together once the lock-on sub-assembly 50 has been installed. A screw threaded into a hole in the lock-on sub-assembly 50 can engage a hole or depression in the cassette large sprocket sub-assembly 46, or vice versa.

Alternately a pin or plunger in shear can be installed in either the large sprocket sub-assembly 46 or the lock-on sub-assembly 50 so that once the two assemblies are twisted together, the plunger or pin slides into a hole in the other piece and prevents back-rotation and disassembly of the two assemblies.

Embodiments of a bicycle cassette comprise two segments that are attached together thereby forming a composite cassette that can be attached to a rear bicycle hub driver body. The bicycle cassette allows for the use of a smaller sprocket on one segment of the cassette because the smaller sprockets can overhang the hub driver body. Specifically, the cassette allows a small 9 or 10 tooth sprocket to overhang the cassette driver body on the bicycle hub by attaching a small sprocket assembly to a larger sprocket assembly using a locking, bayonet style attachment.

In use, the bicycle cassette with a locking connection 30 allows the use of a 9 or 10 tooth sprocket on a portion of the cassette without requiring a complicated fixing structure to attach the smallest sprockets to the cassette. In addition, because the small sprockets can overhang the hub driver body, the small sprockets can have a smaller diameter than the outer diameter of the bearings in the cassette body driver. Consequently, larger, more robust bearings can be used in the driver, which means the hub assembly can be can be stronger and more durable.

In another aspect, different portions of the cassette assembly 30, such as the large sprocket sub-assembly 46 and the lock-on sub-assembly 50 can be manufactured from different materials to strike a balance between system weight and sprocket strength. For example, the largest sprockets of the cassette 30 can be manufactured from aluminum to save weight, and the smaller sprockets can be manufactured from steel and/or titanium to decreased wear from the chain during operation. Additionally, one or both of the large sprocket sub-assembly 46 and the lock-on sub-assembly 50 can be replaced as the sprockets wear.

Another advantage to the cassette assembly 30, such as described above, is that it reduces the number of steps required to assemble a bicycle cassette onto a bicycle hub driver body by eliminating the need to stack many sprockets onto a splined driver before locking the assembly together with a nut. In contrast, the cassette assembly consists of only two finished assemblies and one lock nut. These parts are keyed so they only fit together one way, which simplifies the assembly process. Additionally, installation can be accomplished with the same common tools as used for installation of conventional bicycle cassettes, including wrenches and chain-whip tools. Further, timing between the different sprockets in the cassette sprocket assembly can be controlled if the sprockets are machined from a single piece of material on a CNC Computer Numerically Controlled Milling machine. In conventional cassette sprocket assemblies timing between the sprockets must rely on splined connections or riveted connections between several bodies, which may adversely affect bicycle shifting performance. Accordingly, the bicycle cassette with a locking connection as described herein has many advantages.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A bicycle cassette comprising:
 a. a large sprocket assembly comprising:
  i. one or more locking flanges;
  ii. a torque receiving face;
 b. a small sprocket assembly comprising:
  i. one or more locking tangs;
  ii. a torque driving face;
  iv. one or more locking holes; and
 c. one or more locking mechanisms for locking the small sprocket assembly to the large sprocket assembly,
 wherein after the large sprocket assembly is engaged on a bicycle hub, the small sprocket assembly is aligned with the large sprocket assembly and then the small sprocket assembly is rotated with respect to the large sprocket assembly such that the one or more locking tangs engage the one or more locking flanges, the one or more locking mechanisms engage the one or more locking holes and the torque driving face comes into contact with the torque receiving face to couple and lock the small sprocket assembly to the large sprocket assembly to form the bicycle cassette on the bicycle hub.

2. The bicycle cassette of claim 1, wherein the small sprocket assembly is coupled to the large sprocket assembly using a locking bayonet style attachment.

3. The bicycle cassette of claim 1, wherein the small sprocket assembly comprises a 9 tooth sprocket.

4. The bicycle cassette of claim 1, wherein the small sprocket assembly comprises a 10 tooth sprocket.

5. The bicycle cassette of claim 1, wherein the large sprocket assembly comprises a 42 tooth sprocket.

6. The bicycle cassette of claim 1, wherein the large sprocket assembly comprises a 44 tooth sprocket.

7. The bicycle cassette of claim 1, wherein the large sprocket assembly and the small sprocket assembly are manufactured from different materials.

8. The bicycle cassette of claim 7, wherein larger sprocket assembly is manufactured from aluminum and the small sprocket assembly is manufactured from one of steel and titanium.

9. The bicycle cassette of claim 1, wherein the bicycle cassette attaches to a hub driver body using a single locking ring.

10. The bicycle cassette of claim 1, wherein the one or more locking mechanisms comprise one or more detent balls.

11. A bicycle cassette and hub system comprising;
 a. a rear bicycle hub;
 b. a hub driver assembly coupled to the rear bicycle hub; and
 c. a cassette assembly coupled to the hub driver assembly, the cassette assembly comprising:
  i. a large sprocket assembly comprising:
   1. one or more locking flanges;
   2. a torque receiving face;
  ii. a small sprocket assembly comprising:
   1. one or more locking tangs;
   2. a torque driving face;
   3. one or more locking holes; and
  iii. one or more locking mechanisms for locking the small sprocket assembly to the large sprocket assembly,
 wherein after the large sprocket assembly is engaged on a bicycle hub, the small sprocket assembly is aligned with the large sprocket assembly and then the small sprocket assembly is rotated with respect to the large sprocket assembly such that the one or more locking tangs engage the one or more locking flanges, the one or more locking mechanisms engage the one or more locking holes and the torque driving face comes into contact with the torque receiving face to couple and lock the small sprocket assembly to the large sprocket assembly to form the bicycle cassette assembly on the bicycle hub.

12. The bicycle cassette and hub system of claim 11, wherein the large sprocket assembly is slid onto the hub driver assembly and secured with a locking ring.

13. The bicycle cassette and hub system of claim 11, wherein a sprocket of the small sprocket assembly overhangs an end of the hub driver assembly.

14. The bicycle cassette and hub system of claim 11, wherein the small sprocket assembly is coupled to the large sprocket assembly using a locking bayonet style attachment.

15. The bicycle cassette and hub system of claim 11, wherein the small sprocket assembly comprises a 9 tooth sprocket.

16. The bicycle cassette and hub system of claim 11, wherein the small sprocket assembly comprises a 10 tooth sprocket.

17. The bicycle cassette and hub system of claim 11, wherein the large sprocket assembly comprises a 42 tooth sprocket.

18. The bicycle cassette and hub system of claim 11, wherein the large sprocket assembly comprises a 44 tooth sprocket.

19. The bicycle cassette and hub system of claim 11, wherein the large sprocket assembly and the small sprocket assembly are manufactured from different materials.

20. The bicycle cassette and hub system of claim 11, wherein larger sprocket assembly is manufactured from aluminum and the small sprocket assembly is manufactured from one of steel and titanium.

21. The bicycle cassette and hub system of claim 11, wherein the one or more locking mechanisms comprise one or more detent balls.

22. A method of attaching a bicycle cassette to a hub comprising:
 a. sliding a large sprocket assembly onto a hub driver body to engage the large sprocket assembly to the hub;
 b. after sliding the large sprocket assembly onto the hub driver body, locking the large sprocket assembly onto the hub;
 c. after locking the large sprocket assembly onto the hub, sliding a small sprocket assembly onto the hub driver body; and
 d. attaching the small sprocket assembly to the large sprocket assembly to form the bicycle cassette by aligning the small sprocket assembly with the large sprocket assembly and then rotating the small sprocket assembly with respect to the large sprocket assembly such that one or more locking tangs of the small sprocket assembly engage one or more locking flanges of the large sprocket assembly, one or more locking mechanisms engage one or more locking holes of the sprocket assembly and a torque driving face of the small sprocket assembly comes into contact with a torque receiving face of the large sprocket assembly to couple and lock the small sprocket assembly to the large sprocket assembly to form the bicycle cassette.

23. The method of claim 22, wherein the small sprocket assembly couples to the large sprocket assembly using a locking bayonet style attachment.

24. The method of claim 22, wherein the one or more locking mechanisms comprise one or more detent balls.

* * * * *